United States Patent
Mitsuhashi et al.

(10) Patent No.: US 11,560,485 B2
(45) Date of Patent: Jan. 24, 2023

(54) SURFACE-TREATING AGENT COMPRISING PERFLUORO(POLY)ETHER GROUP-CONTAINING COMPOUND

(71) Applicant: DAIKIN INDUSTRIES, LTD., Osaka (JP)

(72) Inventors: Hisashi Mitsuhashi, Osaka (JP); Masatoshi Nose, Osaka (JP); Kaori Ozawa, Osaka (JP); Tsuneo Yamashita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 745 days.

(21) Appl. No.: 16/476,990

(22) PCT Filed: Jan. 11, 2018

(86) PCT No.: PCT/JP2018/000501
§ 371 (c)(1),
(2) Date: Jul. 10, 2019

(87) PCT Pub. No.: WO2018/131656
PCT Pub. Date: Jul. 19, 2018

(65) Prior Publication Data
US 2021/0277258 A1    Sep. 9, 2021

(30) Foreign Application Priority Data

Jan. 12, 2017  (JP) .............................. JP2017-003662

(51) Int. Cl.
| | | |
|---|---|---|
| *C09D 5/00* | (2006.01) |
| *C09D 5/16* | (2006.01) |
| *C09D 7/48* | (2018.01) |
| *C08G 65/00* | (2006.01) |
| *C08G 65/333* | (2006.01) |
| *C08G 65/336* | (2006.01) |
| *G02B 1/10* | (2015.01) |

(52) U.S. Cl.
CPC .......... *C09D 5/1637* (2013.01); *C08G 65/007* (2013.01); *C08G 65/336* (2013.01); *C08G 65/33317* (2013.01); *C09D 7/48* (2018.01); *G02B 1/10* (2013.01); *C08G 2150/00* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,183,872 B1 | 2/2001 | Tanaka et al. | |
| 10,703,932 B2 * | 7/2020 | Katsukawa | .......... C09D 171/00 |
| 2009/0208728 A1 | 8/2009 | Itami et al. | |

FOREIGN PATENT DOCUMENTS

| | | | |
|---|---|---|---|
| JP | 2008-534696 A | 8/2008 | |
| WO | 97/07155 A1 | 2/1997 | |
| WO | WO-2015099085 A1 * | 7/2015 | ................ C07F 7/10 |

OTHER PUBLICATIONS

WO-2015099085-A1 (Year: 2015).*
International Search Report for PCT/JP2018/000501 dated Feb. 20, 2018.
Communication dated Aug. 4, 2020 from the European Patent Office in counterpart Application No. 18738480.5.
International Preliminary Report on Patentability with translation of Written Opinion dated Jul. 16, 2019 in International Application No. PCT/JP2018/000501.

* cited by examiner

*Primary Examiner* — Stefanie J Cohen
(74) *Attorney, Agent, or Firm* — Sughrue Mion, PLLC

(57) ABSTRACT

A surface-treating agent including a perfluoro(poly)ether group-containing silane compound and a perfluoro(poly)ether group-containing compound. The perfluoro(poly)ether group-containing compound contains a radical capturing group or a UV absorbing group in the molecule.

19 Claims, No Drawings

SURFACE-TREATING AGENT COMPRISING PERFLUORO(POLY)ETHER GROUP-CONTAINING COMPOUND

CROSS REFERENCE TO RELATED APPLICATIONS

This application is a National Stage of International Application No. PCT/JP2018/000501, filed on Jan. 11, 2018, which claims priority from Japanese Patent Application No. 2017-003662, filed on Jan. 12, 2017.

TECHNICAL FIELD

The present invention relates to a surface-treating agent comprising a perfluoro(poly)ether group-containing compound, and more specifically, a surface-treating agent comprising a perfluoro(poly)ether group-containing silane compound and a perfluoro(poly)ether group-containing compound.

BACKGROUND ART

A certain fluorine-containing silane compound is known to be able to provide excellent water-repellency, oil-repellency, antifouling property and the like, when used for surface treatment of base materials. A layer (hereinafter, also referred to as "surface-treating layer") obtained from a surface-treating agent comprising a fluorine-containing silane compound is applied as namely a functional thin film to a wide variety of base materials such as glass, plastic, fibers and building materials.

A known example of such a fluorine-containing compound is a perfluoropolyether group-containing silane compound having a perfluoropolyether group in the molecular backbone and a hydrolyzable group that binds to an Si atom at its molecular terminal or terminal portion (see Patent Literatures 1 and 2).

PRIOR ART DOCUMENT

Patent Literature

Patent Literature 1: National Publication of International Patent Application No. 2008-534696
Patent Literature 2: International Publication No. WO97/07155

SUMMARY OF INVENTION

Problem to be Solved by the Invention

The above surface-treating layer is required to have high durability in order to impart desired functions to a base material for a long period. However, the present inventors have discovered that the above surface-treating layer may have insufficient durability when exposed to light, particularly ultraviolet rays (UV).

An object of the present invention is to provide a novel surface-treating agent, with which a layer having high light stability, particularly high ultraviolet resistance can be formed.

Solution to Problem

According to a first aspect of the present invention, provided is a surface-treating agent comprising:

at least one perfluoro(poly)ether group-containing silane compound selected from the group consisting of the following formulae:

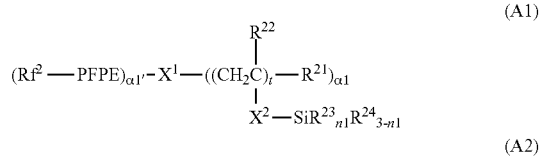

(A1)

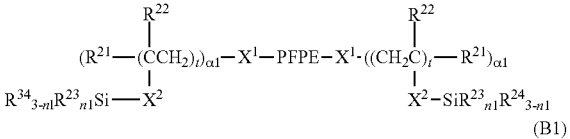

(A2)

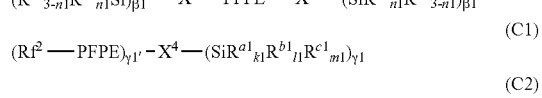

(B1)
(B2)

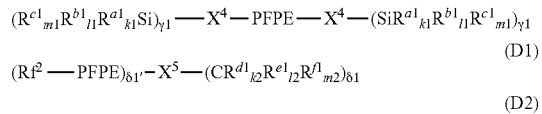

(C1)
(C2)

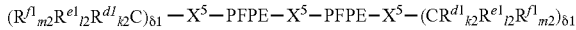

(D1)
(D2)

wherein:
PFPE is each independently at each occurrence a group represented by the formula:

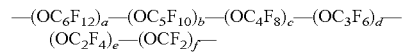

wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

$Rf^2$ represents each independently at each occurrence an alkyl group having 1 to 16 carbon atoms, optionally substituted with one or more fluorine atoms;

$R^{23}$ represents each independently at each occurrence a hydroxyl group or a hydrolyzable group;

$R^{24}$ represents each independently at each occurrence a hydrogen atom or an alkyl group having 1 to 22 carbon atoms;

$R^2$: represents each independently at each occurrence a hydrogen atom or a halogen atom;

$R^{22}$ represents each independently at each occurrence a hydrogen atom or a lower alkyl group;

n1 is independently an integer of 0 to 3 per unit ($-SiR^{23}_{n1}R^{24}_{3-n1}$);

where, in each of the formulae (A1), (A2), (B1) and (B2), at least one n1 is an integer of 1 to 3;

$X^1$ represents each independently a single bond or a di- to deca-valent organic group;

$X^2$ represents each independently at each occurrence a single bond or a divalent organic group;

t is each independently at each occurrence an integer of 1 to 10;

α1 is each independently an integer of 1 to 9;

α1' is each independently an integer of 1 to 9;

$X^3$ represents each independently a single bond or a di- to deca-valent organic group;

$\beta 1$ is each independently an integer of 1 to 9;

$\beta 1'$ is each independently an integer of 1 to 9;

$X^4$ represents each independently a single bond or a di- to deca-valent organic group;

$\gamma 1$ is each independently an integer of 1 to 9;

$\gamma 1'$ is each independently an integer of 1 to 9;

$R^{a1}$ represents each independently at each occurrence $-Z^1-SiR^{11}{}_{p1}R^{12}{}_{q1}R^{13}{}_{r1}$;

$Z^1$ represents each independently at each occurrence an oxygen atom or a divalent organic group;

$R^{11}$ represents each independently at each occurrence $R^{a1'}$;

$R^{a1'}$ has the same definition as that of $R^{a1}$;

in $R^{a1}$, the number of Si to be linked linearly via a $Z^1$ group is up to 5;

$R^{12}$ represents each independently at each occurrence a hydroxyl group or a hydrolyzable group;

$R^{13}$ represents each independently at each occurrence a hydrogen atom or a lower alkyl group;

p1 is each independently at each occurrence an integer of 0 to 3;

q1 is each independently at each occurrence an integer of 0 to 3;

r1 is each independently at each occurrence an integer of 0 to 3;

where, in each of the formulae (C1) and (C2), at least one q1 is an integer of 1 to 3;

$R^{b1}$ represents each independently at each occurrence a hydroxyl group or a hydrolyzable group;

$R^{c1}$ represents each independently at each occurrence a hydrogen atom or a lower alkyl group;

k1 is each independently at each occurrence an integer of 1 to 3;

l1 is each independently at each occurrence an integer of 0 to 2;

m1 is each independently at each occurrence an integer of 0 to 2;

$X^5$ represents each independently a single bond or a di- to deca-valent organic group;

$\delta 1$ is each independently an integer of 1 to 9;

$\delta 1'$ is each independently an integer of 1 to 9;

$R^{d1}$ represents each independently at each occurrence $-Z^2-CR^{51}{}_{p2}R^{52}{}_{q2}R^{53}{}_{r2}$;

$Z^2$ represents each independently at each occurrence an oxygen atom or a divalent organic group;

$R^{51}$ represents each independently at each occurrence $R^{d1'}$;

$R^{d1'}$ has the same definition as that of $R^{d1}$;

in $R^{d1}$, the number of C to be linked linearly via a $Z^2$ group is up to 5;

$R^{52}$ represents each independently at each occurrence $-Z^3-SiR^{55}{}_{n2}R^{56}{}_{3-n2}$;

$Z^3$ represents each independently at each occurrence a divalent organic group;

$R^{55}$ represents each independently at each occurrence a hydroxyl group or a hydrolyzable group;

$R^{56}$ represents each independently at each occurrence a hydrogen atom or a lower alkyl group;

n2 represents independently an integer of 0 to 3 per unit ($-Z^3-SiR^{55}{}_{n2}R^{56}{}_{3-n2}$);

where, in each of the formulae (D1) and (D2), at least one n2 is an integer of 1 to 3;

$R^{53}$ represents each independently at each occurrence a hydrogen atom or a lower alkyl group;

p2 is each independently at each occurrence an integer of 0 to 3;

q2 is each independently at each occurrence an integer of 0 to 3;

r2 is each independently at each occurrence an integer of 0 to 3;

$R^{e1}$ represents each independently at each occurrence $-Z^3-SiR^{55}{}_{n2}R^{56}{}_{3-n2}$;

$R^{f1}$ represents each independently at each occurrence a hydrogen atom or a lower alkyl group;

k2 is each independently at each occurrence an integer of 0 to 3;

l2 is each independently at each occurrence an integer of 0 to 3; and m2 is each independently at each occurrence an integer of 0 to 3;

where, in each of the formulae (D1) and (D2), at least one q2 is 2 or 3, or at least one l2 is 2 or 3, and a perfluoro (poly)ether group-containing compound represented by the following formula:

$$(Rf^1-PFPE)_{\varepsilon 1'}-X-(R^g)_{\varepsilon 1} \tag{1}$$

wherein $Rf^1$ has the same definition as that of $Rf^2$;

PFPE has the same definition as defined above;

X is a di- to deca-valent organic group;

$R^g$ is a radical capturing group or a UV absorbing group;

$\varepsilon 1$ is an integer of 1 to 9; and $\varepsilon 1'$ is an integer of 1 to 9.

According to a second aspect of the present invention, a pellet comprising the above surface-treating agent is provided.

According to a third aspect of the present invention, an article comprising a base material and a layer formed of the above surface-treating agent on the surface of the base material is provided.

Effect of the Invention

According to the present invention, a novel surface-treating agent comprising a perfluoro(poly)ether group (hereinafter, also referred to as "PFPE")-containing silane compound and a PFPE-containing compound is provided. Furthermore, a pellet comprising the surface-treating agent is provided. According to the present invention, an article comprising a layer formed of the above surface-treating agent is provided.

EMBODIMENTS TO CARRY OUT THE INVENTION

The term "di- to deca-valent organic group" as used herein refers to a di- to deca-valent group containing carbon. Examples of such a di- to deca-valent organic group include, but are not limited to, a di- to deca-valent group obtained by removing of 1 to 9 hydrogen atoms from a hydrocarbon group. Examples of the divalent organic group include, but are not limited to, a divalent group obtained by removing of one hydrogen atom from a hydrocarbon group.

The term "hydrocarbon group" as used herein refers to a group containing carbon and hydrogen, and a group obtained by removing one hydrogen atom from a hydrocarbon. Examples of such a hydrocarbon group include, but are not limited to, a hydrocarbon group having 1 to 20 carbon atoms, such as an aliphatic hydrocarbon group and an aromatic hydrocarbon group, optionally substituted with one or more substituents. The above "aliphatic hydrocarbon group" may be linear, branched or cyclic, and may be either saturated or unsaturated. Moreover, the hydrocarbon group may contain one or more ring structures. In addition, such a hydrocarbon group may have at its ends or in its molecular chain one or more N, O, S, Si, amide, sulfonyl, siloxane, carbonyl, carbonyloxy and the like.

Examples of the substituent of the "hydrocarbon group" as used herein include, but are not limited to, a halogen atom; and one or more groups selected from a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5- to 10-membered heterocyclyl group, a 5- to 10-membered unsaturated heterocyclyl group, a $C_{6-10}$ aryl group and a 5- to 10-membered heteroaryl group, which may be substituted by one or more halogen atoms.

As used herein, an alkyl group and a phenyl group may be unsubstituted or substituted, unless otherwise specified. Examples of the substituent of such groups include, but are not limited to, one or more groups selected from a halogen atom, a $C_{1-6}$ alkyl group, a $C_{2-6}$ alkenyl group and a $C_{2-6}$ alkynyl group.

(Surface-Treating Agent)

The surface-treating agent of the present invention is as described below.

The surface-treating agent of the present invention comprises a PFPE-containing silane compound and a PFPE-containing compound.

With the use of the surface-treating agent of the present invention, a surface-treating layer having good friction durability and UV resistance can be formed. It is considered that the PFPE-containing silane compound presents relatively more on the base material side of the surface-treating layer, bonds to the base material, and contributes to the formation of the surface-treating layer having good friction durability. In the surface-treating layer, the PFPE-containing compound having a radical capturing group or a UV absorbing group is considered to contribute to the formation of a surface-treating layer having good UV resistance. Preferably, the PFPE-containing compound is considered to present relatively more on the side opposite to the base material (surface side) of the surface-treating layer.

It is considered that because of the presence of the PFPE-containing compound having a radical capturing group or a UV absorbing group on the surface-treating layer (preferably the surface side of the surface-treating layer) formed using the surface-treating agent of the present invention, the physical properties of the surface-treating layer is maintained well after UV irradiation. Specifically, the surface-treating layer formed using the surface-treating agent of the present invention has excellent UV resistance.

The UV resistance can be evaluated as described below by measuring changes in physical properties (for example, contact angle, friction durability) of the formed surface-treating layer before and after UV irradiation, for example.

Changes in the contact angle can be evaluated by measuring changes in contact angle of water of the surface-treating layer before and after UV irradiation, and then comparing the result before UV irradiation with the result after UV irradiation, for example.

Changes in the friction durability can be evaluated by subjecting the surface-treating layer before and the same after UV irradiation to friction, measuring changes in physical properties (for example, contact angle) of the surface-treating layer as a result of friction, and then comparing the result before UV irradiation with the result after UV irradiation, for example. Friction can be generated by moving steel wool on a surface-treating layer while a load is applied to the steel wool, for example.

The mass ratio of the PFPE-containing silane compound to the PEPE-containing compound contained in the surface-treating agent of the present invention (PFPE-containing silane compound:PEPE-containing compound) is not limited, and may range from 100:0.001 to 100:100, preferably ranges from 100:0.001 to 100:60, more preferably ranges from 100:0.01 to 100:10, further preferably ranges from 100:0.1 to 100:10, particularly preferably ranges from 100:1 to 100:10, particularly preferably ranges from 100:3 to 100:10. With a surface-treating layer formed using a surface-treating agent comprising a PFPE-containing silane compound and a PEPE-containing compound at the above mass ratio, physical properties equivalent to physical properties (for example, contact angle, friction durability) of the surface-treating layer before UV irradiation may be obtained even after UV irradiation, and physical properties (for example, contact angle) before UV irradiation may also be excellent.

In one embodiment, in the surface-treating agent of the present invention, preferably at least 0.001 parts by mass, more preferably at least 3 parts by mass, and further preferably 5 parts by mass of the PEPE-containing compound is contained relative to 100 parts by mass of the PFPE-containing silane compound. In the surface-treating agent of the present invention, preferably 110 parts by mass or less, and more preferably 105 parts by mass or less of the PEPE-containing compound is contained relative to 100 parts by mass of the PFPE-containing silane compound.

In one embodiment, the mass ratio of the PFPE-containing silane compound to the PEPE-containing compound contained in the surface-treating agent (PFPE-containing silane compound:PEPE-containing compound) preferably ranges from 100:0.001 to 100:110, more preferably ranges from 100:3 to 100:110, and further preferably ranges from 100:5 to 100:105.

The PFPE-containing silane compound has a number average molecular weight of preferably 3,000 or more, and more preferably 6,000 or more, and preferably 100,000 or less, more preferably 30,000 or less, and further preferably 10,000 or less. The PFPE-containing silane compound having such a number average molecular weight is preferable in view of friction durability. The "number average molecular weight of the PFPE-containing silane compound" is measured using $^{19}$F-NMR and $^{1}$H-NMR.

Preferably 0.01 to 100 parts by mass, and more preferably 0.1 to 30 parts by mass of the PFPE-containing silane compound is contained per 100 parts by mass of the surface-treating agent.

The PFPE-containing silane compound is at least one compound selected from the group consisting of compounds represented by the following formulae (A1), (A2), (B1), (B2), (C1), (C2), (D1) and (D2). In view of particularly good friction durability, the PFPE-containing silane compound is preferably at least one compound selected from the group consisting of compounds represented by (C1), (C2), (D2) and (D2), and more preferably at least one compound selected from the group consisting of compounds represented by (C1) and (C2).

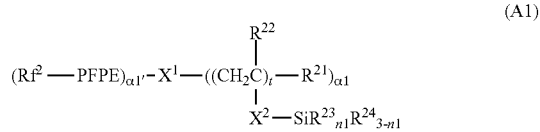

(A1)

-continued

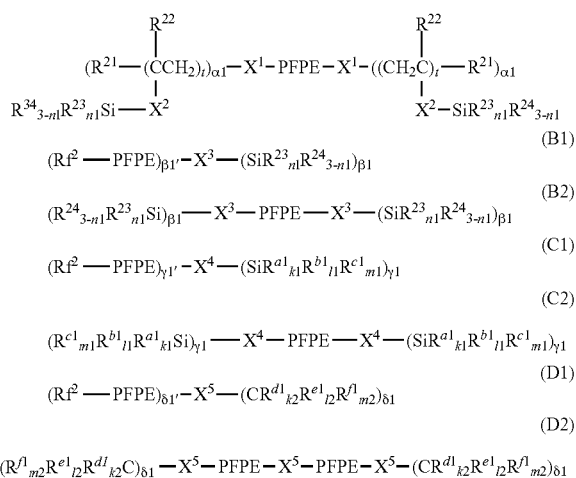

wherein:
PFPE is each independently at each occurrence a group represented by the formula:

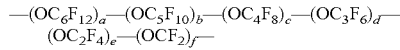

wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

$Rf^2$ represents each independently at each occurrence an alkyl group having 1 to 16 carbon atoms, optionally substituted with one or more fluorine atoms;

$R^{23}$ represents each independently at each occurrence a hydroxyl group or a hydrolyzable group;

$R^{24}$ represents each independently at each occurrence a hydrogen atom or an alkyl group having 1 to 22 carbon atoms;

$R^{21}$ represents each independently at each occurrence a hydrogen atom or a halogen atom;

$R^{22}$ represents each independently at each occurrence a hydrogen atom or a lower alkyl group;

n1 is independently an integer of 0 to 3 per unit $(-SiR^{23}_{n1}R^{24}_{3-n1})$;

where, in each of the formulae (A1), (A2), (B1) and (B2), at least one n1 is an integer of 1 to 3;

$X^1$ represents each independently a single bond or a di- to deca-valent organic group;

$X^2$ represents each independently at each occurrence a single bond or a divalent organic group;

t is each independently at each occurrence an integer of 1 to 10;

α1 is each independently an integer of 1 to 9;
α1' is each independently an integer of 1 to 9;

$X^3$ represents each independently a single bond or a di- to deca-valent organic group;

β1 is each independently an integer of 1 to 9;
β1' is each independently an integer of 1 to 9;

$X^4$ represents each independently a single bond or a di- to deca-valent organic group;

γ1 is each independently an integer of 1 to 9;
γ1' is each independently an integer of 1 to 9;

$R^{a1}$ represents each independently at each occurrence $-Z^1-SiR^{11}_{p1}R^{12}_{q1}R^{13}_{r1}$;

$Z^1$ represents each independently at each occurrence an oxygen atom or a divalent organic group;

$R^{11}$ represents each independently at each occurrence $R^{a1'}$;

$R^{a1'}$ has the same definition as that of $R^{a1}$;

in $R^{a1}$, the number of Si to be linked linearly via a $Z^1$ group is up to 5;

$R^{12}$ represents each independently at each occurrence a hydroxyl group or a hydrolyzable group;

$R^{13}$ represents each independently at each occurrence a hydrogen atom or a lower alkyl group;

p1 is each independently at each occurrence an integer of 0 to 3;

q1 is each independently at each occurrence an integer of 0 to 3;

r1 is each independently at each occurrence an integer of 0 to 3;

where, in each of the formulae (C1) and (C2), at least one q1 is an integer of 1 to 3;

$R^{b1}$ represents each independently at each occurrence a hydroxyl group or a hydrolyzable group;

$R^{c1}$ represents each independently at each occurrence a hydrogen atom or a lower alkyl group;

k1 is each independently at each occurrence an integer of 1 to 3;

l1 is each independently at each occurrence an integer of 0 to 2;

m1 is each independently at each occurrence an integer of 0 to 2;

$X^5$ represents each independently a single bond or a di- to deca-valent organic group;

δ1 is each independently an integer of 1 to 9;
δ1' is each independently an integer of 1 to 9;

$R^{d1'}$ represents each independently at each occurrence $-Z^2-CR^{51}_{p2}R^{52}_{q2}R^{53}_{r2}$;

$Z^2$ represents each independently at each occurrence an oxygen atom or a divalent organic group;

$R^{51}$ represents each independently at each occurrence $R^{d1'}$;

$R^{d1'}$ has the same definition as that of $R^{d1}$;

in $R^{d1}$, the number of C to be linked linearly via a $Z^2$ group is up to 5;

$R^{52}$ represents each independently at each occurrence $-Z^3-SiR^{55}_{n2}R^{56}_{3-n2}$;

$Z^3$ represents each independently at each occurrence a divalent organic group;

$R^{55}$ represents each independently at each occurrence a hydroxyl group or a hydrolyzable group;

$R^{56}$ represents each independently at each occurrence a hydrogen atom or a lower alkyl group;

n2 represents independently an integer of 0 to 3 per unit $(-Z^3-SiR^{55}_{n2}R^{56}_{3-n2})$;

where, in each of the formulae (D1) and (D2), at least one n2 is an integer of 1 to 3;

$R^{53}$ represents each independently at each occurrence a hydrogen atom or a lower alkyl group;

p2 is each independently at each occurrence an integer of 0 to 3;

q2 is each independently at each occurrence an integer of 0 to 3;

r2 is each independently at each occurrence an integer of 0 to 3;

$R^{e1}$ represents each independently at each occurrence $-Z^3-SiR^{55}_{n2}R^{56}_{3-n2}$;

$R^{f1}$ represents each independently at each occurrence a hydrogen atom or a lower alkyl group;

k2 is each independently at each occurrence an integer of 0 to 3;

l2 is each independently at each occurrence an integer of 0 to 3; and m2 is each independently at each occurrence an integer of 0 to 3;

where, in each of the formulae (D1) and (D2), at least one q2 is 2 or 3, or at least one l2 is 2 or 3.

Formulae (A1) and (A2):

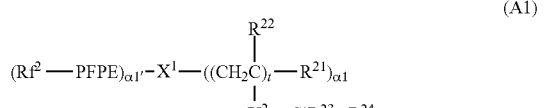

(A1)

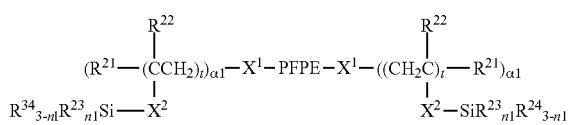

(A2)

In the above formulae, $Rf^2$ represents each independently at each occurrence an alkyl group having 1 to 16 carbon atoms, optionally substituted with one or more fluorine atoms.

The "alkyl group having 1 to 16 carbon atoms" in the above alkyl group having 1 to 16 carbon atoms, optionally substituted with one or more fluorine atoms may be linear or branched, is preferably a linear or branched alkyl group having 1 to 6 carbon atoms, particularly 1 to 3 carbon atoms, and is more preferably a linear alkyl group having 1 to 3 carbon atoms.

The $Rf^2$ is preferably an alkyl group having 1 to 16 carbon atoms, substituted with one or more fluorine atoms, more preferably a $CF_2H$—$C_{1-15}$fluoroalkyl group, and further preferably a perfluoroalkyl group having 1 to 16 carbon atoms.

The perfluoroalkyl group having 1 to 16 carbon atoms may be linear or branched, and is preferably a linear or branched perfluoroalkyl group having 1 to 6 carbon atoms, particularly 1 to 3 carbon atoms, more preferably a linear perfluoroalkyl group having 1 to 3 carbon atoms, and is specifically —$CF_3$, —$CF_2CF_3$ or —$CF_2CF_2CF_3$.

In the above formulae, PFPE is each independently at each occurrence a group represented by

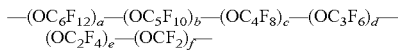

wherein a, b, c, d, e and f are each independently an integer of 0 or more and 200 or less, and the sum of a, b, c, d, e and f is at least 1. Preferably, a, b, c, d, e and f are each independently an integer of 0 or more and 100 or less. Preferably, the sum of a, b, c, d, e and f is at least 5, more preferably at least 10, and for example 10 or more and 100 or less. The occurrence order of the respective repeating units in parentheses with the subscript a, b, c, d, e or f is not limited in the formula.

These repeating units may be linear or branched, and are preferably linear. For example, —$(OC_6F_{12})$— may be —$(OCF_2CF_2CF_2CF_2CF_2CF_2)$—, —$(OCF(CF_3)CF_2CF_2CF_2CF_2)$—, —$(OCF_2CF(CF_3)CF_2CF_2CF_2)$—, —$(OCF_2CF_2CF(CF_3)CF_2CF_2)$—, —$(OCF_2CF_2CF_2CF(CF_3)CF_2)$—, —$(OCF_2CF_2CF_2CF_2CF(CF_3))$—, for example, and is preferably —$(OCF_2CF_2CF_2CF_2CF_2CF_2)$—. —$(OC_5F_{10})$— may be —$(OCF_2CF_2CF_2CF_2CF_2)$—, —$(OCF(CF_3)CF_2CF_2CF_2)$—, —$(OCF_2CF(CF_3)CF_2CF_2)$—, —$(OCF_2CF_2CF(CF_3)CF_2)$—, —$(OCF_2CF_2CF_2CF(CF_3))$—, for example, and is preferably —$(OCF_2CF_2CF_2CF_2CF_2)$—. —$(OC_4F_8)$— may be any one of —$(OCF_2CF_2CF_2CF_2)$—, —$(OCF(CF_3)CF_2CF_2)$—, —$(OCF_2CF(CF_3)CF_2)$—, —$(OCF_2CF_2CF(CF_3))$—, —$(OC(CF_3)_2CF_2)$—, —$(OCF_2C(CF_3)_2)$—, —$(OCF(CF_3)CF(CF_3))$—, —$(OCF(C_2F_5)CF_2)$— and —$(OCF_2CF(C_2F_5))$—, and is preferably —$(OCF_2CF_2CF_2CF_2)$—. —$(OC_3F_6)$— may be any one of —$(OCF_2CF_2CF_2)$—, —$(OCF(CF_3)CF_2)$— and —$(OCF_2CF(CF_3))$—, and is preferably —$(OCF_2CF_2CF_2)$—. Moreover, —$(OC_2F_4)$— may be any one of —$(OCF_2CF_2)$— and —$(OCF(CF_3))$—, and is preferably —$(OCF_2CF_2)$—.

In one embodiment, the PFPE is —$(OC_3F_6)_d$— wherein d is an integer of 1 or more and 200 or less, preferably 5 or more and 200 or less, and more preferably 10 or more and 200 or less. Preferably, PFPE is —$(OCF_2CF_2CF_2)_d$— wherein d is an integer of 1 or more and 200 or less, preferably 5 or more and 200 or less, and more preferably 10 or more and 200 or less, or —$(OCF(CF_3)CF_2)_d$— wherein d is an integer of 1 or more and 200 or less, preferably 5 or more and 200 or less, and more preferably 10 or more and 200 or less. More preferably, PFPE is —$(OCF_2CF_2CF_2)_d$— wherein d is an integer of 1 or more and 200 or less, preferably 5 or more and 200 or less, and more preferably 10 or more and 200 or less.

In another embodiment, PFPE is —$(OC_4F_8)_c$—$(OC_3F_6)_d$—$(OC_2F_4)_e$—$(OCF_2)_f$— wherein c and d are each independently an integer of 0 or more and 30 or less, e and f are each independently an integer of 1 or more and 200 or less, preferably 5 or more and 200 or less, and more preferably 10 or more and 200 or less, and the occurrence order of the respective repeating units in parentheses with the subscript c, d, e or f is not limited in the formula. Preferably, PFPE is —$(OCF_2CF_2CF_2CF_2)_c$—$(OCF_2CF_2CF_2)_d$—$(OCF_2CF_2)_e$—$(OCF_2)_f$—. In one embodiment, PFPE may be —$(OC_2F_4)_e$—$(OCF_2)_f$— wherein e and f are each independently an integer of 1 or more and 200 or less, preferably 5 or more and 200 or less, and more preferably 10 or more and 200 or less, and the occurrence order of the respective repeating units in parentheses with the subscript e or f is not limited in the formula.

In another embodiment, PFPE is a group represented by —$(R^6$—$R^7)_j$—. In the formula, $R^6$ is $OCF_2$ or $OC_2F_4$, and preferably $OC_2F_4$. In the formula, $R^7$ is a group selected from $OC_2F_4$, $OC_3F_6$, $OC_4F_8$, $OC_5F_{10}$ and $OC_6F_{12}$, or a combination of two or three groups selected independently from these groups. Preferably, $R^7$ is a group selected from $OC_2F_4$, $OC_3FE$ and $OC_4F_8$, a group selected from $OC_3F_6$, $OC_4F_8$, $OC_5F_{10}$ and $OC_6F_{12}$, or a combination of two or three groups selected independently from these groups. Examples of a combination of two or three groups selected independently from $OC_2F_4$, $OC_3F_6$ and $OC_4F_8$ include, but are not limited to, —$OC_2F_4OC_3F_6$—, —$OC_2F_4OC_4F_6$—, —$OC_3F_6OC_2F_4$—, —$OC_3F_6OC_3F_6$—, —$OC_3F_6OC_4F_6$—, —$OC_4F_8OC_4F_6$—, —$OC_4F_8OC_3F_6$—, —$OC_4F_8OC_2F_4$—, —$OC_2F_4OC_2F_4OC_3F_6$—, —$OC_2F_4OC_2F_4OC_4F_6$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_6OC_2F_4OC_4F_6$—. The j is an integer of 2 to 100, and preferably an integer of 2 to 50. In the above formula, $OC_2F_4$, $OC_3F_6$, $OC_4F_6$, $OC_5F_{10}$ and $OC_6F_{12}$ may be linear or branched, and is preferably linear. In this embodiment, PFPE is preferably —$(OC_2F_4$—$OC_3F_6)_j$— or —$(OC_2F_4$—$OC_4F_2)_j$—.

In the PFPE, the ratio of e to f (hereafter, "e/f ratio") is 0.1 or more and 10 or less, preferably 0.2 or more and 5.0 or less, more preferably 0.2 or more and 2.0 or less, further preferably 0.2 or more and 1.5 or less, and further more preferably 0.2 or more and 0.85 or less. With the e/f ratio of 10 or less, a surface-treating layer obtained from the compound has further improved lubricity, friction durability and resistance to chemicals (for example, durability against artificial sweat). The lower the e/f ratio, the more improved lubricity and friction durability of the surface-treating layer. In the meantime, the e/f ratio of 0.1 or more may result in more improved stability of the compound. The higher the e/f ratio, the more improved stability of the compound.

The number average molecular weight of an $Rf^2$—PFPE portion is not limited and ranges from 500 to 30,000, preferably 1,000 to 20,000, and more preferably 2,000 to 15,000. The number average molecular weight is measured by $^{19}F$-NMR.

In another embodiment, the number average molecular weight of the $Rf^2$—PFPE- portion or the —PFPE- portion may range from 4,000 to 30,000, and preferably 5,000 to 10,000.

In the above formulae, $R^{23}$ represents each independently at each occurrence a hydroxyl group or a hydrolyzable group.

In the above formulae, $R^{24}$ represents each independently at each occurrence a hydrogen atom or an alkyl group having 1 to 22 carbon atoms, and preferably an alkyl group having 1 to 4 carbon atoms.

The "hydrolyzable group" as used herein refers to a group that can undergo hydrolysis reaction, and specifically refers to a group that can dissociate from the main chain of the compound as a result of hydrolysis reaction. Examples of such a hydrolyzable group include —OR, —OCOR, —O—N=CR$_2$, —NR$_2$, —NHR and halogen, wherein R is a substituted or unsubstituted alkyl group having 1 to 4 carbon atoms, and a hydrolyzable group is preferably —OR (specifically, alkoxy group). Examples of R include unsubstituted alkyl groups such as a methyl group, an ethyl group, a propyl group, an isopropyl group, a n-butyl group and an isobutyl group; and substituted alkyl groups such as a chloromethyl group. Of these examples, an alkyl group, particularly an unsubstituted alkyl group is preferable, and a methyl group or an ethyl group is more preferable. A hydroxyl group is not limited and may be generated by hydrolysis of a hydrolyzable group.

In the above formulae, $R^{21}$ represents, at each occurrence, each independently a hydrogen atom or a halogen atom. A halogen atom is preferably an iodine atom, a chlorine atom or a fluorine atom, and more preferably a fluorine atom.

In the above formulae, $R^{22}$ represents, at each occurrence, each independently a hydrogen atom or a lower alkyl group. A lower alkyl group is preferably an alkyl group having 1 to 20 carbon atoms, and more preferably an alkyl group having 1 to 6 carbon atoms, and examples thereof include a methyl group, an ethyl group and a propyl group.

In the above formulae, n1 of each (—$SiR^{23}_{n1}R^{24}_{3-n1}$) unit is independently an integer of 0 to 3, preferably 0 to 2, and more preferably 0. In the formulae, all n1s are never simultaneously 0. In other words, at least one $R^{23}$ is present in the formulae.

In the above formulae, $X^1$ represents each independently a single bond or a di- to deca-valent organic group. The $X^1$ is, in compounds represented by the formulae (A1) and (A2), construed as a linker for linking a perfluoropolyether portion (specifically, $Rf^2$—PFPE portion or —PFPE- portion) providing mainly water-repellency, surface lubricity etc., and a silane portion (specifically, the group in parentheses with the subscript α1) providing bonding capacity with a base material. Accordingly, the $X^1$ may be any organic group as long as compounds represented by the formulae (A1) and (A2) can be stably present.

In the above formulae, α1 is an integer of 1 to 9, and α1' is an integer of 1 to 9. These α1 and α' may be determined depending on the valence of $X^1$. In the formula (A1), the sum of α1 and α1' is the same as the valence of $X^1$. For example, when $X^1$ is a deca-valent organic group, the sum of α1 and α1' is 10, and for example, α1 can be 9 and α1' can be 1, α1 can be 5 and α1' can be 5, or α1 can be 1 and α1' can be 9. Moreover, when $X^1$ is a divalent organic group, α1 and α1' are 1. In the formula (A2), α1 is a value obtained by subtracting 1 from the valence of $X^1$.

The $X^1$ is preferably a di- to hepta-valent, more preferably di- to tetra-valent, and further preferably divalent organic group.

In one embodiment, $X^1$ is a di- to tetra-valent organic group, α1 is between 1 and 3, and α1' is 1.

In another embodiment, $X^1$ is a divalent organic group, α1 is 1, and α1' is 1. In this case, the formulae (A1) and (A2) are represented by the following formulae (A1') and (A2').

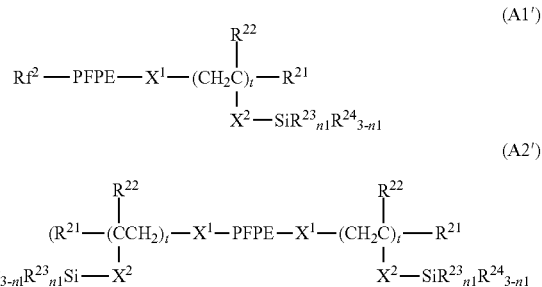

Examples of the $X^1$ include, but are not limited to, a divalent group represented by the following formula:

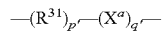

wherein:

$R^{31}$ represents a single bond, —(CH$_2$)$_{s'}$— or an o-, m- or p-phenylene group, and is preferably —(CH$_2$)$_{s'}$—, s' is an integer of 1 to 20, preferably an integer of 1 to 6, more preferably an integer of 1 to 3, and further more preferably 1 or 2, $X^a$ represents —(X$^b$)$_{t'}$—, $X^b$ represents each independently at each occurrence a group selected from the group consisting of —O—, —S—, an o-, m- or p-phenylene group, —C(O)O—, —Si(R$^{33}$)$_2$—, —(Si(R$^{33}$)$_2$O)$_{m'}$—Si(R$^{33}$)$_2$—, —CONR$^{34}$—, —O—CONR$^{34}$—, —NR$^{34}$— and —(CH$_2$)$_{n'}$—, $R^{33}$ represents each independently at each occurrence a phenyl group, a $C_{1-6}$ alkyl group or a $C_{1-6}$ alkoxy group, is preferably a phenyl group or a $C_{1-6}$ alkyl group, and more preferably a methyl group, $R^{34}$ represents each independently at each occurrence a hydrogen atom, a phenyl group or a $C_{1-6}$ alkyl group (preferably methyl group), m' is, at each occurrence, each independently an integer of 1 to 100, and preferably an integer of 1 to 20, n' is, at each occurrence, each independently, an integer of 1 to 20, preferably an integer of 1 to 6, and more preferably an integer of 1 to 3, l' is an integer of 1 to 10, preferably an integer of 1 to 5, and more preferably an integer of 1 to 3, p' is 0 or 1, and q' is 0 or 1, where, at least one of p' and q' is 1, and the occurrence order of the respective repeating units in parentheses with the subscript p' or q' is not limited in the formula. Here, $R^{31}$ and $X^a$ (typically a hydrogen atom of $R^{31}$ and $X^a$) are optionally substituted with one or more substituents selected from a fluorine atom, a $C_{1-3}$ alkyl group and a $C_{1-3}$ fluoroalkyl group.

Preferably, the $X^1$ is —$(R^{31})_{p'}$—$(X^a)_{q'}$—$R^{32}$—. $R^{32}$ represents a single bond, —$(CH_2)_{t'}$— or an o-, m- or p-phenylene group, and is preferably —$(CH_2)_{t'}$—. t' is an integer of 1 to 20, preferably an integer of 2 to 6, and more preferably an integer of 2 to 3. Here, $R^{32}$ (typically a hydrogen atom of $R^{32}$) is optionally substituted with one or more substituents selected from a fluorine atom, a $C_{1-3}$ alkyl group and a $C_{1-3}$ fluoroalkyl group.

Preferably, the $X^1$ can be
a $C_{1-20}$ alkylene group,
—$R^{31}$—$X^c$—$R^{32}$— or
—$X^d$—$R^{32}$—
wherein $R^{31}$ and $R^{32}$ are as defined above.

More preferably, the $X^1$ is
a $C_{1-20}$ alkylene group,
—$(CH_2)_{a'}$—$X^c$—,
—$(CH_2)_{s'}$—$X^c$—$(CH_2)_{t'}$—,
—$X^d$— or
—$X^d$—$(CH_2)_{t'}$—
wherein s' and t' are as defined above.

In the above formula, $X^c$ represents
—O—,
—S—,
—C(O)O—,
—$CONR^{34}$—,
—O—$CONR^{34}$—,
—$Si(R^{33})_2$—,
—$(Si(R^{33})_2O)_{m'}$—$Si(R^{33})_2$—,
—O—$(CH_2)_{u'}$—$(Si(R^{33})_2O)_{m'}$—$Si(R^{33})_2$—,
—O—$(CH_2)_{s'}$—$Si(R^{33})_2$—O—$Si(R^{33})_2$—$CH_2CH_2$—Si$(R^{33})_2$—O—$Si(R^{33})_2$—,
—O—$(CH_2)_{u'}$—$Si(OCH_3)_2OSi(OCH_3)_2$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$—, or
—$CONR^{34}$-(o-, m- or p-phenylene)-$Si(R^{33})_2$—
wherein $R^{33}$, $R^{34}$ and m' are as defined above, and u' is an integer of 1 to 20, preferably an integer of 2 to 6, and more preferably an integer of 2 to 3. $X^c$ is preferably —O—.

In the above formula, $X^d$ represents
—S—,
—C(O)O—,
—$CONR^{34}$—,
—$CONR^{34}$—$(CH_2)_{u'}$—$(Si(R^{33})_2O)_{m'}$—$Si(R^{33})_2$—,
—$CONR^{34}$—$(CH_2)_{u'}$—$N(R^{34})$— or
—$CONR^{34}$-(o-, m- or p-phenylene)-$Si(R^{33})_2$—
wherein each symbol is as defined above.

More preferably, the $X^1$ can be
a $C_{1-20}$ alkylene group,
—$(CH_2)_{s'}$—$X^c$—$(CH_2)_{t'}$— or
—$X^d$—$(CH_2)_{t'}$—
wherein each symbol is as defined above.

Furthermore preferably, the $X^1$ is
a $C_{1-20}$ alkylene group,
—$(CH_2)_{s'}$—O—$(CH_2)_{t'}$—,
—$(CH_2)_{s'}$—$(Si(R^{33})_2O)_{m'}$—$Si(R^{33})_2$—$(CH_2)_{t'}$—,
—$(CH_2)_{s'}$—O—$(CH_2)_{u'}$—$(Si(R^{33})_2O)_{m'}$—$Si(R^{33})_2$—$(CH_2)_{t'}$— or
—$(CH_2)_{s'}$—O—$(CH_2)_{t'}$—$Si(R^{33})_2$—$(CH_2)_{u'}$—$Si(R^{33})_2$—$(C_vH_{2v})$— wherein $R^{33}$, m', s', t' and u' are as defined above, and v is an integer of 1 to 20, preferably an integer of 2 to 6, and more preferably an integer of 2 to 3.

In the above formula, —$(C_vH_{2v})$— may be linear or branched, and can be, for example, —$CH_2$—, —$CH_2CH_2$—, —$CH_2CH_2CH_2$—, —$CH(CH_3)$— and —$CH(CH_3)CH_2$—.

The $X^1$ group is optionally substituted with one or more substituents selected from a fluorine atom, a $C_{1-3}$ alkyl group and a $C_{1-3}$ fluoroalkyl group (preferably, $C_{1-3}$ perfluoroalkyl group).

In one embodiment, the $X^1$ group can be a group other than the —O—$C_{1-6}$ alkylene group.

In another embodiment, examples of the $X^1$ group include the following groups:

$$—D—Si(R^{41})_2—O—Si(R^{41})_2—E—$$

$$—D—Si(R^{41})_2—O—Si(R^{41})_2—O—Si(R^{41})_2—E—$$

$$—D—Si(R^{41})_2—O—Si(R^{41})_2—O—Si(R^{41})_2—O—Si(R^{41})_2—E—$$

$$—D—Si(R^{41})_2—O—Si(R^{41})_2—O—Si(R^{41})_2—O—Si(R^{41})_2—O—Si(R^{41})_2—E—$$

$$—D—Si(R^{41})_2—CH_2CH_2—Si(R^{41})_2—E—$$

$$—D—Si(R^{41})_2—(p\text{-phenylene})—Si(R^{41})_2—E—$$

$$—D—Si(R^{41})_2—(\text{cyclohexylene})—Si(R^{41})_2—E—$$

wherein $R^{41}$ is each independently a hydrogen atom, a phenyl group, an alkyl group having 1 to 6 carbon atoms, or a $C_{1-6}$ alkoxy group, and preferably a methyl group;

D is a group selected from
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—, —CONH—(CH$_2$)$_3$—,
—CON(CH$_3$)—(CH$_2$)$_3$—,
—CON(Ph)-(CH$_2$)$_3$— wherein Ph represents phenyl, and

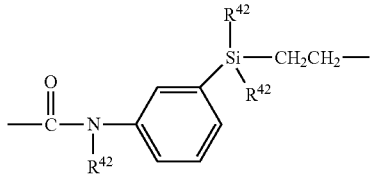

wherein R$^{42}$ represents each independently a hydrogen atom, a C$_{1-6}$ alkyl group or a C$_{1-6}$ alkoxy group, preferably a methyl group or a methoxy group, and more preferably a methyl group, E is —(CH$_2$)$_{ne}$— (ne is an integer of 2 to 6), and D binds to PFPE of the molecular backbone, and E binds to a group opposite to PFPE.

Specific examples of the X$^1$ include:
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—(CH$_2$)$_2$—,
—CONH—(CH$_2$)$_3$—,
—(CH$_2$)$_2$—Si(CH$_3$)$_2$—(CH$_2$)$_2$—,
—CON(CH$_3$)—(CH$_2$)$_3$—,
—CON(Ph)-(CH$_2$)$_3$— wherein Ph represents phenyl,
—CONH—(CH$_2$)$_6$—,
—CON(CH$_3$)—(CH$_2$)$_6$—,
—CON(Ph)-(CH$_2$)$_6$— wherein Ph represents phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

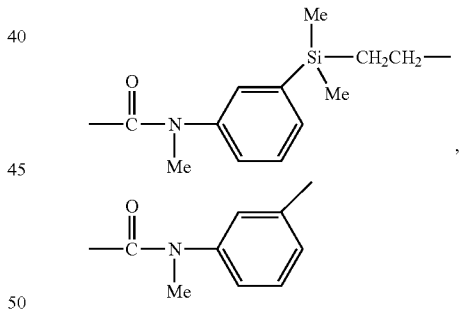

In another embodiment, X$^1$ is a group represented by the formula: —(R$^{16}$)$_x$—(CFR$^{17}$)$_y$—(CH$_2$)$_z$— wherein x, y and z are each independently an integer of 0 to 10, the sum of x, y and z is at least 1, and the occurrence order of the respective repeating units in parentheses is not limited in the formula.

In the above formula, R$^{16}$ is each independently at each occurrence an oxygen atom, phenylene, carbazolylene, —NR$^{18}$— wherein R$^{18}$ represents a hydrogen atom or an organic group, or a divalent organic group. Preferably, R$^{16}$ is an oxygen atom or a divalent polar group.

Examples of the "divalent polar group" include, but are not limited to, —C(O)—, —C(=NR$^{19}$)— and —C(O)NR$^{19}$— (in these formulae, R$^{19}$ represents a hydrogen atom or a lower alkyl group). The "lower alkyl group" is, for example, an alkyl group having 1 to 6 carbon atoms, such as methyl, ethyl or n-propyl, and they are optionally substituted with one or more fluorine atoms.

In the above formula, $R^{17}$ is each independently at each occurrence a hydrogen atom, a fluorine atom or a lower fluoroalkyl group, and is preferably a fluorine atom. The "lower fluoroalkyl group" is, for example, a fluoroalkyl group having 1 to 6 carbon atoms, and preferably 1 to 3 carbon atoms, preferably a perfluoroalkyl group having 1 to 3 carbon atoms, more preferably a trifluoromethyl group, a pentafluoroethyl group, and further preferably a trifluoromethyl group.

In this embodiment, $X^1$ is preferably a group represented by the formula: $-(O)_x-(CF_2)_y-(CH_2)_z-$ wherein x, y and z are as defined above, and the occurrence order of the respective repeating units in parentheses is not limited in the formula.

Examples of the group represented by the formula: $-(O)_x-(CF_2)_y-(CH_2)_z-$ include a group represented by $-(O)_{x'}-(CH_2)_{z''}-O-[(CH_2)_{z'''}-O-]_{z''''}$ and $-(O)_{x'}-(CF_2)_{y''}-(CH_2)_{z''}-O-[(CH_2)_{z'''}-O-]_{z''''}$ wherein x' is 0 or 1, y", z" and z''' are each independently an integer of 1 to 10, and z'''' is 0 or 1. Note that the left ends of these groups bind to the PFPE side.

In another preferred embodiment, $X^1$ is $-O-CFR^{20}-(CF_2)_{e'}-$.

The $R^{20}$ represents each independently a fluorine atom or a lower fluoroalkyl group. Here, a lower fluoroalkyl group is, for example, a fluoroalkyl group having 1 to 3 carbon atoms, preferably a perfluoroalkyl group having 1 to 3 carbon atoms, more preferably a trifluoromethyl group, a pentafluoroethyl group, and further preferably a trifluoromethyl group.

The e' is each independently 0 or 1.

In a specific example, $R^{20}$ is a fluorine atom and e' is 1.

In another embodiment, examples of the $X^1$ group include the following groups:

[chemical structures]

wherein
$R^{41}$ is each independently a hydrogen atom, a phenyl group, an alkyl group having 1 to 6 carbon atoms, or a $C_{1-6}$ alkoxy group, and preferably a methyl group;
in each $X^1$ group, some of Ts are optionally the following groups that bind to PFPE of the molecular backbone:
—$CH_2O(CH_2)_2$—,
—$CH_2O(CH_2)_3$—,
—$CF_2O(CH_2)_3$—,
—$CH_2$—,
—$(CH_2)_3$—,
—$(CH_2)_3$—
—$(CH_2)_4$—,
—$CONH$—$(CH_2)_3$—,
—$CON(CH_3)$—$(CH_2)_3$—,
—$CON(Ph)$-$(CH_2)_3$— wherein Ph represents phenyl, or

[chemical structure]

wherein $R^{42}$ represents each independently a hydrogen atom, a $C_{1-6}$ alkyl group or a $C_{1-6}$ alkoxy group, preferably a methyl group or a methoxy group, and more preferably a methyl group, some of other Ts are —$(CH_2)_{n''}$— (n" is an integer of 2 to 6) that binds to a group opposite to PFPE of the molecular backbone (specifically, carbon atoms in the formulae (A1) and (A2), and Si atoms in the following formulae (B1), (B2), (C1) and (C2)), and if the remaining Ts are present, the remaining Ts are each independently a methyl group, a phenyl group and a $C_{1-6}$ alkoxy group.

In this embodiment, $X^1$, $X^3$ and $X^4$ can be each independently a tri- to deca-valent organic group.

In the above formulae, t is each independently an integer of 1 to 10. In a preferred embodiment, t is an integer of 1 to 6. In another preferred embodiment, t is an integer of 2 to 10, and preferably an integer of 2 to 6.

In the above formulae, $X^2$ represents each independently at each occurrence a single bond or a divalent organic group. $X^2$ is preferably an alkylene group having 1 to 20 carbon atoms, and more preferably —$(CH_2)_u$— wherein u is an integer of 0 to 2.

Compounds represented by the preferable formulae (A1) and (A2) are compounds represented by the following formulae (A1') and (A2'):

$$Rf^2-PFPE-X^1-(CH_2C)_t-R^{21} \atop {R^{22} \atop X^2-SiR^{23}_{n1}R^{24}_{3-n1}}$$ (A1')

$$(R^{21}-(CCH_2)_t-X^1-PFPE-X^1-(CH_2C)_t-R^{21} \atop {R^{22} \quad\quad\quad\quad\quad\quad R^{22} \atop R^{34}_{3-n1}R^{23}_{n1}Si-X^2 \quad\quad X^2-SiR^{23}_{n1}R^{24}_{3-n1}})$$ (A2')

wherein:

PFPE is each independently a group represented by the formula:

—$(OC_6F_{12})_a$—$(OC_5F_{10})_b$—$(OC_4F_8)_c$—$(OC_3F_6)_d$— $(OC_2F_4)_e$—$(OCF_2)_f$— wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

$Rf^2$ represents each independently at each occurrence an alkyl group having 1 to 16 carbon atoms, optionally substituted with one or more fluorine atoms;

$R^{23}$ represents each independently at each occurrence a hydroxyl group or a hydrolyzable group;

$R^{24}$ represents each independently at each occurrence a hydrogen atom or an alkyl group having 1 to 22 carbon atoms;

$R^{21}$ represents each independently at each occurrence a hydrogen atom or a halogen atom;

$R^{22}$ represents each independently at each occurrence a hydrogen atom or a lower alkyl group;

n1 is an integer of 1 to 3, and preferably 3;

$X^1$ is each independently at each occurrence —O—$CFR^{20}$—$(CF_2)_{e'}$—;

$R^{20}$ is each independently at each occurrence a fluorine atom or a lower fluoroalkyl group;

e' is each independently at each occurrence 0 or 1;

$X^2$ is —$(CH_2)_u$—;

u is each independently at each occurrence an integer of 0 to 2; and t is each independently at each occurrence an integer of 1 to 10.

Compounds represented by the above formulae (A1) and (A2) can be obtained by, for example, using a perfluoropolyether derivative corresponding to an $Rf^2$—PFPE-portion as a raw material, introducing iodine into its end, and then reacting the resultant with a vinyl monomer corresponding to —$CH_2CR^{22}$ ($X^2$—$SiR^{23}_{n1}R^{24}_{3-n1}$)—.

Formulae (B1) and (B2):

$$(Rf^2-PFPE)_{\beta 1'}-X^3-(SiR^{23}_{n1}R^{24}_{3-n1})_{\beta 1}$$ (B1)

$$(R^{24}_{3-n1}R^{23}_{n1}Si)_{\beta 1'}-X^3-PFPE-X^3-(SiR^{23}_{n1}R^{24}_{3-n1})_{\beta 1}$$ (B2)

In the above formulae (B1) and (B2), $Rf^2$, PFPE, $R^{23}$, $R^{24}$ and n1 are as defined for the above formulae (A1) and (A2).

In the above formulae, $X^3$ represents each independently a single bond or a di- to deca-valent organic group. The $X^3$ is, in compounds represented by the formulae (B1) and (B2), construed as a linker for linking a perfluoropolyether portion ($Rf^2$—PFPE portion or —PFPE-portion) providing mainly water-repellency, surface lubricity etc., and a silane portion (specifically, —$SiR^{23}_{n1}R^{24}_{3-n1}$) providing bonding capacity with a base material. Accordingly, the $X^3$ may be any organic group as long as compounds represented by the formulae (B1) and (B2) can be stably present.

In the above formulae, β1 is an integer of 1 to 9 and β1' is an integer of 1 to 9. These β1 and β1' are determined depending on the valence of $X^3$. In the formula (B1), the sum of β1 and β1' is the same as the valence of $X^3$. For example, when $X^3$ is a deca-valent organic group, the sum of β1 and β1' is 10, and for example, β1 can be 9 and β1' can be 1, β1 can be 5 and β1' can be 5, or β1 can be 1 and β1' can be 9. Moreover, when $X^3$ is a divalent organic group, β1 and β1' are 1. In the formula (B2), β1 is a value obtained by subtracting 1 from the valence of $X^3$.

The $X^3$ is preferably a di- to hepta-valent, more preferably di- to tetra-valent, and further preferably divalent organic group.

In one embodiment, $X^3$ is a di- to tetra-valent organic group, β1 is between 1 and 3, and β1' is 1.

In another embodiment, $X^3$ is a divalent organic group, β1 is 1, and β1' is 1. In this case, the formulae (B1) and (B2) are represented by the following formulae (B1') and (B2').

$$Rf^2-PFPE-X^3-SiR^{23}_{n1}R^{24}_{3-n1}$$ (B1')

$$R^{24}_{3-n1}R^{23}_{n1}Si-X^3-PFPE-X^3-SiR^{23}_{n1}R^{24}_{3-n1}$$ (B2')

Examples of the $X^3$ include, but are not limited to, organic groups similar to those described for $X^1$.

Particularly preferable specific examples of the $X^3$ include

—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,

—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—(CH$_2$)$_2$—,
—CONH—(CH$_2$)$_3$—,
—(CH$_2$)$_2$—Si(CH$_3$)$_2$—(CH$_2$)$_2$—,
—CON(CH$_3$)—(CH$_2$)$_3$—,
—CON(Ph)-(CH$_2$)$_3$— wherein Ph represents phenyl,
—CONH—(CH$_2$)$_6$—,
—CON(CH$_3$)—(CH$_2$)$_6$—,
—CON(Ph)-(CH$_2$)$_6$— wherein Ph represents phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

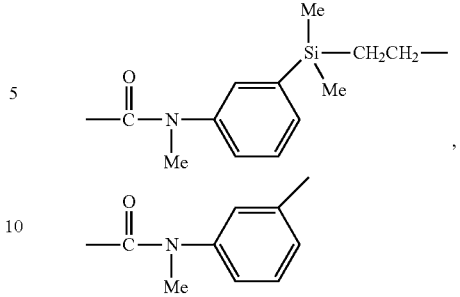

Compounds represented by the preferable formulae (B1) and (B2) are compounds represented by the following formulae (B1') and (B2'):

  (B1')

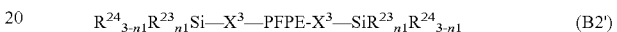  (B2')

wherein:

PFPE is each independently a group represented by the formula:

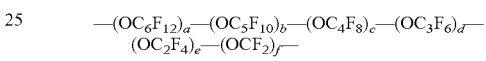

wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

$Rf^2$ represents each independently at each occurrence an alkyl group having 1 to 16 carbon atoms, optionally substituted with one or more fluorine atoms;

$R^{23}$ represents each independently at each occurrence a hydroxyl group or a hydrolyzable group;

$R^{24}$ represents each independently at each occurrence a hydrogen atom or an alkyl group having 1 to 22 carbon atoms;

n1 is an integer of 1 to 3, and preferably 3; and $X^3$ is —CH$_2$O(CH$_2$)$_2$—, —CH$_2$O(CH$_2$)$_3$— or —CH$_2$O(CH$_2$)$_6$—.

Compounds represented by the above formulae (B1) and (B2) can be produced by a known method, such as a method described in JPA 2013-117012 or a modified method thereof.

Formulae (C1) and (C2):

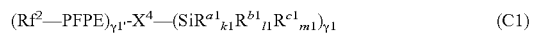  (C1)

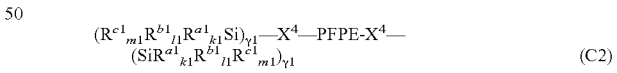  (C2)

In the above formulae (C1) and (C2), $Rf^2$ and PFPE are as defined for the above formulae (A1) and (A2).

In the above formulae, $X^4$ represents each independently a single bond or a di- to deca-valent organic group. The $X^4$ is, in compounds represented by the formulae (C1) and (C2), construed as a linker for linking a perfluoropolyether portion ($Rf^2$—PFPE portion or —PFPE-portion) providing mainly water-repellency, surface lubricity etc., and a silane portion (specifically, —SiR$^{a1}_{k1}$R$^{b1}_{l1}$R$^{c1}_{m1}$ group) providing bonding capacity with a base material. Accordingly, the $X^4$ may be any organic group as long as compounds represented by the formulae (C1) and (C2) can be stably present.

In the above formulae, γ1 is an integer of 1 to 9 and γ1' is an integer of 1 to 9. These γ1 and β1' are determined depending on the valence of $X^4$. In the formula (C1), the sum of γ1 and γ1' is the same as the valence of $X^4$. For example, when $X^4$ is a deca-valent organic group, the sum of γ1 and γ1' is 10, and for example, γ1 can be 9 and γ1' can be 1, γ1 can be 5 and γ1' can be 5, or γ1 can be 1 and γ1' can be 9. Moreover, when $X^4$ is a divalent organic group, γ1 and γ1' are 1. In the formula (C2), $γ^1$ is a value obtained by subtracting 1 from the valence of $X^4$.

The $X^4$ is preferably a di- to hepta-valent, more preferably di- to tetra-valent, and further preferably divalent organic group.

In one embodiment, $X^4$ is a di- to tetra-valent organic group, γ1 is between 1 and 3, and $γ^{1'}$ is 1.

In another embodiment, $X^1$ is a divalent organic group, γ1 is 1, and γ1' is 1. In this case, the formulae (C1) and (C2) are represented by the following formulae (C1') and (C2').

$$Rf^2—PFPE-X^4—(SiR^{a1}{}_{k1}R^{b1}{}_{l1}R^{c1}{}_{m1}) \quad (C1')$$

$$R^{c1}{}_{m1}R^{b1}{}_{l1}R^{a1}{}_{k1}Si—X^4—PFPE-X^4— \\ SiR^{a1}{}_{k1}R^{b1}{}_{l1}R^{c1}{}_{m1} \quad (C2')$$

Examples of the $X^4$ include, but are not limited to, organic groups similar to those described for $X^1$.

Particularly preferable specific examples of the $X^4$ include
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_3CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2$—$CF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—CONH—,
—CONH—$(CH_2)_2$—,
—CONH—$(CH_2)_3$—,
—$(CH_2)_2$—$Si(CH_3)_2$—$(CH_2)_2$—,
—$CON(CH_3)$—$(CH_2)_3$—,
—CON(Ph)-$(CH_2)_3$— wherein Ph represents phenyl,
—CONH—$(CH_2)_6$—,
—$CON(CH_3)$—$(CH_2)_6$—,
—CON(Ph)-$(CH_2)_6$— wherein Ph represents phenyl,
—CONH—$(CH_2)_2NH(CH_2)_3$—,
—CONH—$(CH_2)_6NH(CH_2)_3$—,
—$CH_2O$—CONH—$(CH_2)_3$—,
—$CH_2O$—CONH—$(CH_2)_6$—,
—S—$(CH_2)_3$—,
—$(CH_2)_2S(CH_2)_3$—,
—CONH—$(CH_2)_3Si(CH_3)_2OSi(CH_3)_2(CH_2)_2$—,
—CONH—$(CH_2)_3Si(CH_3)_2OSi(CH_3)_2OSi(CH_3)_2(CH_2)_2$—,
—CONH—$(CH_2)_3Si(CH_3)_2O(Si(CH_3)_2O)_2Si(CH_3)_2(CH_2)_2$—,
—CONH—$(CH_2)_3Si(CH_3)_2O(Si(CH_3)_2O)_3Si(CH_3)_2(CH_2)_2$—,
—CONH—$(CH_2)_3Si(CH_3)_2O(Si(CH_3)_2O)_{10}Si(CH_3)_2(CH_2)_2$—,
—CONH—$(CH_2)_3Si(CH_3)_2O(Si(CH_3)_2O)_{20}Si(CH_3)_2(CH_2)_2$—
—C(O)O—$(CH_2)_3$—,
—C(O)O—$(CH_2)_6$—,
—$CH_2$—O—$(CH_2)_3$—$Si(CH_3)_2$—$(CH_2)_2$—$Si(CH_3)_2$—$(CH_2)_2$—,
—$CH_2$—O—$(CH_2)_3$—$Si(CH_3)_2$—$(CH_2)_2$—$Si(CH_3)_2$—$CH(CH_3)$—,
—$CH_2$—O—$(CH_2)_3$—$Si(CH_3)_2$—$(CH_2)_2$—$Si(CH_3)_2$—$(CH_2)_3$—,
—$CH_2$—O—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—,

,

In the above formulae, $R^{a1}$ represents each independently at each occurrence —$Z^1$—$SiR^{11}{}_{p1}R^{12}{}_{q1}R^{13}{}_{r1}$.

In the formula, $Z^1$ represents each independently at each occurrence an oxygen atom or a divalent organic group.

The $Z^1$ is preferably a divalent organic group, and does not include a group which forms a siloxane bond together with an Si atom (the Si atom to which $R^{a1}$ binds) at an end of the molecular backbone in the formula (C1) or formula (C2).

The above $Z^1$ is preferably a $C_{1-6}$ alkylene group, —$(CH_2)_g$—O—$(CH_2)_h$— (wherein g is an integer of 1 to 6, and h is an integer of 1 to 6), or -phenylene-$(CH_2)_i$— (wherein i is an integer of 0 to 6), and more preferably a $C_{1-3}$ alkylene group. These groups are optionally substituted with, for example, one or more substituents selected from a fluorine atom, a $C_{1-6}$ alkyl group, a $C_{2-6}$ alkenyl group and a $C_{2-6}$ alkynyl group.

In the formula, $R^{11}$ represents each independently at each occurrence $R^{a1'}$. $R^{a1'}$ is as defined for $R^{a1}$.

In $R^{a1}$, the number of Si to be linked linearly via a $Z^1$ group is up to 5. Specifically, in the above $R^{a1}$, when at least one $R^{a1}$ is present, at least two Si atoms are present and linked linearly via $Z^1$ groups in $R^{a1}$, but such number of Si atoms to be linked linearly via a $Z^1$ group is up to 5. Note that "the number of Si atoms to be linked linearly via a $Z^1$ group in $R^{a1}$" is the same as the number of repetition of —$Z^1$—Si— to be linked linearly in $R^{a1}$.

For example, an example of Si atoms linked via $Z^1$ groups in $R^{a1}$ is depicted as follows.

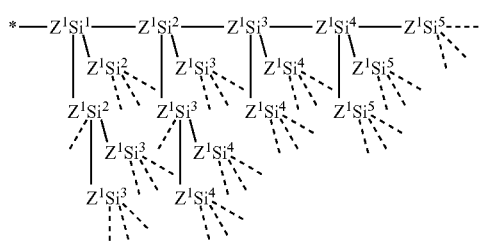

In the above formula, * represents a position bonding to Si in the main backbone, " . . . " represents the bonding of predetermined groups other than $Z^1$Si, and specifically when all three bonds of a Si atom are " . . . ", it means an end point of the repeat of $Z^1$Si Moreover, each numeral at the right shoulder of Si denotes the number of occurrence of Si linked linearly via a $Z^1$ group, which is counted from *. In other words, a chain in which the repeat of $Z^1$Si is completed at $Si^2$, "the number of Si atoms to be linked linearly via a $Z^1$ group in $R^{a1}$" is 2, and similarly, chains in which the repeat of $Z^1$Si is completed at $Si^3$, $Si^4$ and $Si^5$, "the number of Si atoms to be linked linearly via a $Z^1$ group in $R^{a1}$" is 3, 4 and 5, respectively. In addition, as is clear from the above formula, multiple $Z^1$Si chains are present in $R^{a1}$, but these chains are not required to have the same length and may have optional lengths.

In a preferred embodiment, "the number of Si atoms to be linked linearly via a $Z^1$ group in $R^{a1}$" is 1 (left formula) or 2 (right formula) in all chains, as depicted below.

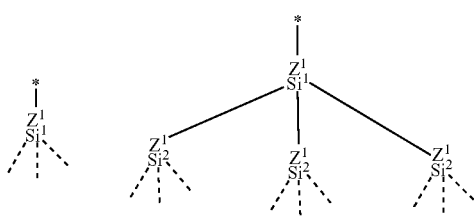

In one embodiment, the number of Si atoms to be linked linearly via a $Z^1$ group in $R^{a1}$ is 1 or 2, and preferably 1.

In the formula, $R^{12}$ represents each independently at each occurrence a hydroxyl group or a hydrolyzable group. "Hydrolyzable group" is as defined above.

Preferably, $R^{12}$ is —OR wherein R represents a substituted or unsubstituted $C_{1-3}$ alkyl group, and more preferably a methyl group.

In the formula, $R^{13}$ represents each independently at each occurrence a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formula, p1 is each independently at each occurrence an integer of 0 to 3; q1 is each independently at each occurrence an integer of 0 to 3; and r1 is each independently at each occurrence an integer of 0 to 3. Here the sum of p1, q1 and r1 is 3.

In a preferred embodiment, in $R^{a1'}$ at an end in $R^{a1}$ (when $R^{a1'}$ is absent, $R^{a1}$), the above q1 is preferably at least 2, 2 or 3, for example, and more preferably 3.

In a preferred embodiment, at least one of the ends of $R^{a1}$ is —Si(—$Z^1$—$SiR^{12}_{q1}R^{13}_{r1}$)$_2$ or —Si(—$Z^1$—$SiR^{12}_{q1}R^{13}_{r1}$)$_3$, and preferably —Si(—$Z^1$—$SiR^{12}_{q1}R^{13}_{r1}$)$_3$. In the formula, the (—$Z^1$—$SiR^{12}_{q1}R^{13}_{r1}$) unit is preferably (—$Z'$—$SiR^{12}_3$). Furthermore, in a preferred embodiment, all the ends of $R^a$ is —Si(—$Z^1$—$SiR^{12}_{q1}R^{13}_{r1}$)$_3$, and preferably Si(—$Z^1$—$SiR^{12}_3$)$_3$.

In the above formulae (C1) and (C2), at least one q1 is an integer of 1 to 3, and in other words, at least one $R^{12}$ is present.

In the above formulae, $R^{b1}$ represents each independently at each occurrence a hydroxyl group or a hydrolyzable group.

The above $R^{b1}$ is preferably a hydroxyl group, —OR, —OCOR, —O—N=C(R)$_2$, —N(R)$_2$, —NHR, halogen (in these formulae, R denotes a substituted or unsubstituted alkyl group having 1 to 4 carbon atoms), and more preferably —OR. R includes unsubstituted alkyl groups such as a methyl group, an ethyl group, a propyl group, an isopropyl group, a n-butyl group, and an isobutyl group; and substituted alkyl groups such as a chloromethyl group. Of these examples, an alkyl group, particularly an unsubstituted alkyl group is preferred, and a methyl group or an ethyl group is more preferred. A hydroxyl group is not limited, and may result from hydrolysis of a hydrolyzable group. More preferably, $R^{b1}$ is —OR wherein R represents a substituted or unsubstituted $C_{1-3}$ alkyl group, and more preferably a methyl group.

In the above formulae, $R^{c1}$ represents each independently at each occurrence a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formulae, k1 is each independently at each occurrence an integer of 1 to 3; l1 is each independently at each occurrence an integer of 0 to 2; and m1 is each independently at each occurrence an integer of 0 to 2. Here, the sum of k1, l1 and m1 is 3.

Compounds represented by the above formulae (C1) and (C2) can be obtained by, for example, by introducing a hydroxyl group in the end of a perfluoropolyether derivative corresponding to an $Rf^2$—PFPE- portion as a raw material, then further introducing a group having an unsaturated bond in the end thereof, reacting the group having the unsaturated bond with a silyl derivative having a halogen atom, and further introducing a hydroxyl group into the terminal silyl group, to react the introduced group having the unsaturated bond with the silyl derivative. For example, such a compound can be synthesized as described in WO2014/069592.

Formulae (D1) and (D2):

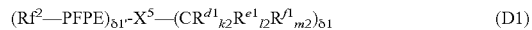

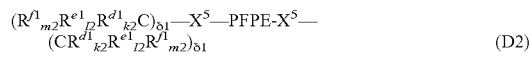

In the above formulae (D1) and (D2), $Rf^2$ and PFPE are as defined for the above formulae (A1) and (A2).

In the above formulae, $X^5$ represents each independently a single bond or a di- to deca-valent organic group. The $X^5$ is, in compounds represented by the formulae (D1) and (D2), construed as a linker for linking a perfluoropolyether portion (specifically, $Rf^2$—PFPE portion or —PFPE- portion) providing mainly water-repellency, surface lubricity etc., and a portion (specifically, the group in parentheses with the subscript δ1) providing bonding capacity with a base material. Accordingly, the $X^5$ may be any organic group as long as compounds represented by the formulae (D1) and (D2) can be stably present.

In the above formula, δ1 is an integer of 1 to 9, and δ1' is an integer of 1 to 9. These δ1 and δ1' may be determined depending on the valence of $X^5$. In the formula (D1), the sum of δ1 and δ1' is the same as the valence of $X^5$. For example, when $X^5$ is a deca-valent organic group, the sum of δ1 and δ1' is 10, and for example, δ1 is 9 and δ1' is 1, δ1 is 5 and δ1' is 5, or δ1 is 1 and δ1' is 9. Moreover, when $X^5$ is a divalent organic group, δ1 and δ1' are 1. In the formula (D2), δ1 is a value obtained by subtracting 1 from the valence of $X^5$.

The $X^5$ is preferably a di- to hepta-valent, more preferably di- to tetra-valent, and further preferably divalent organic group.

In one embodiment, $X^5$ is a di- to tetra-valent organic group, δ1 is between 1 and 3, and δ1' is 1.

In another embodiment, $X^5$ is a divalent organic group, δ1 is 1, and δ1' is 1. In this case, the formulae (D1) and (D2) are represented by the following formulae (D1') and (D2').

$$Rf^2\text{–PFPE-}X^5\text{—}CR^{d1}_{k2}R^{e1}_{l2}R^{f1}_{m2} \quad (D1')$$

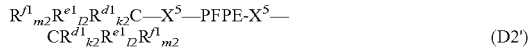

$$R^{f1}_{m2}R^{e1}_{l2}R^{d1}_{k2}C\text{—}X^5\text{—PFPE-}X^5\text{—}$$
$$CR^{d1}_{k2}R^{e1}_{l2}R^{f1}_{m2} \quad (D2')$$

Examples of the $X^5$ include, but are not limited to, organic groups similar to those described for $X^1$.

Particularly preferable specific examples of the $X^5$ include
—$CH_2O(CH_2)_2$—,
—$CH_2O(CH_2)_3$—,
—$CH_2O(CH_2)_6$—,
—$CH_2O(CH_2)_3Si(CH_3)_2OSi(CH_3)_2(CH_2)_2$—,
—$CH_2O(CH_2)_3Si(CH_3)_2OSi(CH_3)_2OSi(CH_3)_2(CH_2)_2$—,
—$CH_2O(CH_2)_3Si(CH_3)_2O(Si(CH_3)_2O)_2Si(CH_3)_2(CH_2)_2$—,
—$CH_2O(CH_2)_3Si(CH_3)_2O(Si(CH_3)_2O)_3Si(CH_3)_2(CH_2)_2$—,
—$CH_2O(CH_2)_3Si(CH_3)_2O(Si(CH_3)_2O)_{10}Si(CH_3)_2(CH_2)_2$—,
—$CH_2O(CH_2)_3Si(CH_3)_2O(Si(CH_3)_2O)_{20}Si(CH_3)_2(CH_2)_2$—,
—$CH_2OCF_2CHFOCF_2$—,
—$CH_2OCF_2CHFOCF_2CF_2$—,
—$CH_2OCF_2CHFOCF_2CF_2CF_2$—,
—$CH_2OCH_2CF_2CF_2OCF_2$—,
—$CH_2OCH_2CF_2CF_2OCF_2CF_2$—,
—$CH_2OCH_2CF_2CF_2OCF_2CF_2CF_2$—,
—$CH_2OCH_2CF_2CF_2OCF(CF_3)CF_2OCF_2$—,
—$CH_2OCH_2CF_2CF_2OCF(CF_3)CF_2OCF_2CF_2$—,
—$CH_2OCH_2CF_2CF_2OCF(CF_3)CF_2OCF_2CF_2CF_2$—,
—$CH_2OCH_2CHFCF_2OCF_2$—,
—$CH_2OCH_2CHFCF_2OCF_2CF_2$—,
—$CH_2OCH_2CHFCF_2OCF_2CF_2CF_2$—,
—$CH_2OCH_2CHFCF_2OCF(CF_3)CF_2OCF_2$—,
—$CH_2OCH_2CHFCF_2OCF(CF_3)CF_2OCF_2CF_2$—,
—$CH_2OCH_2CHFCF_2OCF(CF_3)CF_2OCF_2CF_2CF_2$—,
—$CH_2OCH_2(CH_2)_7CH_2Si(OCH_3)_2OSi(OCH_3)_2(CH_2)_2Si(OCH_3)_2OSi(OCH_3)_2(CH_2)_2$—,
—$CH_2OCH_2CH_2CH_2Si(OCH_3)_2OSi(OCH_3)_2(CH_2)_3$—,
—$CH_2OCH_2CH_2CH_2Si(OCH_2CH_3)_2OSi(OCH_2CH_3)_2(CH_2)_3$—,
—$CH_2OCH_2CH_2CH_2Si(OCH_3)_2OSi(OCH_3)_2(CH_2)_2$—,
—$CH_2OCH_2CH_2CH_2Si(OCH_2CH_3)_2OSi(OCH_2CH_3)_2(CH_2)_2$—,
—$CH_2$—,
—$(CH_2)_2$—,
—$(CH_2)_3$—,
—$(CH_2)_4$—,
—$(CH_2)_5$—,
—$(CH_2)_6$—,
—$CO$—,
—$CONH$—,
—$CONH$—$CH_2$—,
—$CONH$—$(CH_2)_2$—,
—$CONH$—$(CH_2)_3$—,
—$(CH_2)_2$—$Si(CH_3)_2$—$(CH_2)_2$—,
—$CON(CH_3)$—$(CH_2)_3$—,
—$CON(Ph)$-$(CH_2)_3$— wherein Ph denotes phenyl,
—$CONH$—$(CH_2)_6$—,
—$CON(CH_3)$—$(CH_2)_6$—,
—$CON(Ph)$-$(CH_2)_6$— wherein Ph denotes phenyl,
—$CONH$—$(CH_2)_2NH(CH_2)_3$—,
—$CONH$—$(CH_2)_6NH(CH_2)_3$—,
—$CH_2O$—$CONH$—$(CH_2)_3$—,
—$CH_2O$—$CONH$—$(CH_2)_6$—,
—$S$—$(CH_2)_3$—,
—$(CH_2)_2S(CH_2)_3$—,
—$CONH$—$(CH_2)_3Si(CH_3)_2OSi(CH_3)_2(CH_2)_2$—,
—$CONH$—$(CH_2)_3Si(CH_3)_2OSi(CH_3)_2OSi(CH_3)_2(CH_2)_2$—,
—$CONH$—$(CH_2)_3Si(CH_3)_2O(Si(CH_3)_2O)_2Si(CH_3)_2(CH_2)_2$—,
—$CONH$—$(CH_2)_3Si(CH_3)_2O(Si(CH_3)_2O)_3Si(CH_3)_2(CH_2)_2$—,
—$CONH$—$(CH_2)_3Si(CH_3)_2O(Si(CH_3)_2O)_{10}Si(CH_3)_2(CH_2)_2$—,
—$CONH$—$(CH_2)_3Si(CH_3)_2O(Si(CH_3)_2O)_{20}Si(CH_3)_2(CH_2)_2$—,
—$C(O)O$—$(CH_2)_3$—,
—$C(O)O$—$(CH_2)_6$—,
—$CH_2$—$O$—$(CH_2)_3$—$Si(CH_3)_2$—$(CH_2)_2$—$Si(CH_3)_2$—$(CH_2)_2$—,
—$CH_2$—$O$—$(CH_2)_3$—$Si(CH_3)_2$—$(CH_2)_2$—$Si(CH_3)_2$—$CH(CH_3)$—,
—$CH_2$—$O$—$(CH_2)_3$—$Si(CH_3)_2$—$(CH_2)_2$—$Si(CH_3)_2$—$(CH_2)_3$—,
—$CH_2$—$O$—$(CH_2)_3$—$Si(CH_3)_2$—$(CH_2)_2$—$Si(CH_3)_2$—$CH(CH_3)$—$CH_2$—,
—$OCH_2$—,
—$O(CH_2)_3$—,
—$OCFHCF_2$—,

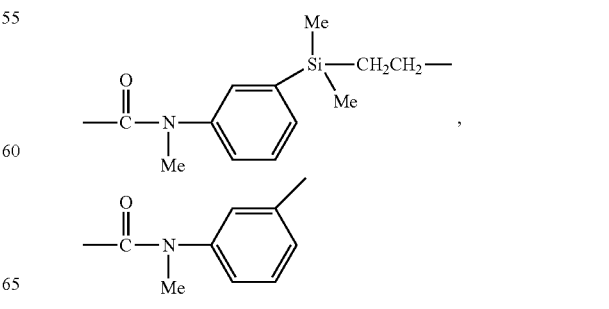

In the above formulae, $R^{d1}$ represents each independently at each occurrence $-Z^2-CR^{51}{}_{p2}R^{52}{}_{q2}R^{53}{}_{r2}$.

In the formula, $Z^2$ represents each independently at each occurrence an oxygen atom or a divalent organic group.

The $Z^2$ is preferably a $C_{1-6}$ alkylene group, $-(CH_2)_g-O-(CH_2)_h-$ (wherein g is an integer of 0 to 6, such as an integer of 1 to 6, and h is an integer of 0 to 6, such as an integer of 1 to 6), or -phenylene-$(CH_2)_i-$ (wherein i is an integer of 0 to 6), and more preferably a $C_{1-3}$ alkylene group. These groups are optionally substituted with one or more substituents selected from, for example, a fluorine atom, a $C_{1-6}$ alkyl group, a $C_{2-6}$ alkenyl group and a $C_{2-6}$ alkynyl group.

In the formula, $R^{51}$ represents each independently at each occurrence $R^{d1'}$. $R^{d1'}$ is as defined for $R^{d1}$.

In $R^{d1}$, the number of C to be linked linearly via a $Z^2$ group is up to 5. Specifically, in the above $R^{d1}$, when at least one $R^{51}$ is present, at least two Si atoms are present and linked linearly via $Z^2$ groups in $R^{d1}$, but such number of C atoms to be linked linearly via a $Z^2$ group is up to 5. Note that "the number of C atoms to be linked linearly via a $Z^2$ group in $R^{d1}$" is the same as the number of repetition of $-Z^2-C-$ to be linked linearly in $R^{d1}$.

In a preferred embodiment, "the number of C atoms to be linked linearly via a $Z^2$ group in $R^{d1}$" is 1 (left formula) or 2 (right formula) in all chains as described below.

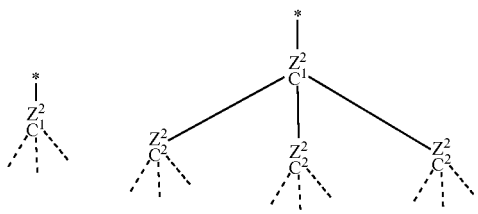

In one embodiment, the number of C atoms to be linked linearly via a $Z^2$ group in $R^{d1}$ is 1 or 2, and preferably 1.

In the formula, $R^{52}$ represents each independently at each occurrence $-Z^3-SiR^{55}{}_{n2}R^{56}{}_{3-n2}$.

$Z^3$ represents each independently at each occurrence a divalent organic group.

In a preferred embodiment, $Z^3$ is a $C_{1-6}$ alkylene group, $-(CH_2)_{g'}-O-(CH_2)_{h'}-$ (wherein g' is an integer of 0 to 6, such as an integer of 1 to 6, and h' is an integer of 0 to 6, such as an integer of 1 to 6), or -phenylene-$(CH_2)_{i'}-$ (wherein i' is an integer of 0 to 6). These groups are optionally substituted with one or more substituents selected from, for example, a fluorine atom, a $C_{1-6}$ alkyl group, a $C_{2-6}$ alkenyl group and a $C_{2-6}$ alkynyl group.

In one embodiment, $Z^3$ is a $C_{1-6}$ alkylene group or -phenylene-$(CH_2)_i-$. When $Z^3$ is the above group, light resistance, particularly ultraviolet resistance may be more increased.

The $R^{55}$ represents each independently at each occurrence a hydroxyl group or a hydrolyzable group.

Examples of the "hydrolyzable group" include groups similar to those described for the formulae (C1) and (C2).

Preferably, $R^{55}$ is $-OR$ wherein R represents a substituted or unsubstituted $C_{1-3}$ alkyl group, more preferably an ethyl group or a methyl group, particularly a methyl group.

The $R^{56}$ represents each independently at each occurrence a hydrogen atom or a lower alkyl group. The lower alkyl group is preferably an alkyl group having 1 to 20 carbon atoms, more preferably an alkyl group having 1 to 6 carbon atoms, and further preferably a methyl group.

n2 of each $(-Z^3-SiR^{55}{}_{n2}R^{56}{}_{3-n2})$ unit represents independently an integer of 1 to 3, and is preferably 2 or 3, and more preferably 3.

The $R^{53}$ represents each independently at each occurrence a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the formula, p2 is each independently at each occurrence an integer of 0 to 3; q2 is each independently at each occurrence an integer of 0 to 3; and r2 is each independently at each occurrence an integer of 0 to 3. Here, the sum of p2, q2 and r2 is 3.

In a preferred embodiment, in $R^{d1'}$ at an end in $R^{d1}$ (when $R^{d1'}$ is absent, $R^{d1}$), the q2 is preferably at least 2, such as 2 or 3, and more preferably 3.

In a preferred embodiment, at least one of the ends of $R^{d1}$ is $-C(-Z^2-SiR^{52}{}_{q2}R^{53}{}_{r2})_2$ or $-C(-Z^2-SiR^{52}{}_{q2}R^{53}{}_{r2})_3$, and preferably $-C(-Z^2-SiR^{52}{}_{q2}R^{53}{}_{r2})_3$. In the formula, the $(-Z^2-SiR^{52}{}_{q2}R^{53}{}_{r2})$ unit is preferably $(-Z^2-SiR^{52}{}_3)$. Furthermore, in a preferred embodiment, all the ends of $R^{d1}$ is $-C(-Z^2-SiR^{52}{}_{q2}R^{53}{}_{r2})_3$, and preferably $-C(-Z^2-SiR^{52}{}_3)_3$.

In the above formulae, $R^{a1}$ represents each independently at each occurrence $-Z^3-SiR^{55}{}_{n2}R^{56}{}_{3-n2}$. Here, $Z^3$, $R^{55}$, $R^{56}$ and n2 are as defined for the above $R^{52}$.

In the above formulae, $R^{f1}$ represents each independently at each occurrence a hydrogen atom or a lower alkyl group. The lower alkyl group is preferably an alkyl group having 1 to 20 carbon atoms, more preferably an alkyl group having 1 to 6 carbon atoms, and further preferably a methyl group.

In the above formulae, k2 is each independently at each occurrence an integer of 0 to 3; l2 is each independently at each occurrence an integer of 0 to 3; and m2 is each independently at each occurrence an integer of 0 to 3. Here, the sum of k2, l2 and m2 is 3.

In one embodiment, at least one k2 is 2 or 3, and preferably 3.

In one embodiment, k2 is 2 or 3, and preferably 3.

In one embodiment, l2 is 2 or 3, and preferably 3.

In the above formulae (D1) and (D2), at least one q2 is 2 or 3, or at least one l2 is 2 or 3. Specifically, in the formulae, at least two $-Z^3-SiR^{55}{}_{n2}R^{56}{}_{3-n2}$ groups are present.

The PFPE-containing silane compound represented by the formula (D1) or (D2) can be produced through combination of known methods. For example, a compound represented by the formula (D1') wherein $X^5$ is divalent can be produced as described below, but the method is not limited thereto.

A group containing a double bond (preferably allyl group), and a halogen (preferably bromo) are introduced into polyhydric alcohol represented by HO—$X^5$—C($Z^3$OH)$_3$ wherein $X^5$ and $Z^3$ are each independently a divalent organic group, thereby obtaining a double bond-containing halide represented by Hal-$X^5$—C($Z^3$—O—R—CH=CH$_2$)$_3$ wherein Hal is halogen, such as Br, and R is a divalent organic group, such as an alkylene group. Subsequently, terminal halogen is reacted with perfluoropolyether group-containing alcohol represented by $R^{PFPE}$—OH wherein $R^{PFPE}$ is a perfluoropolyether group-containing group, thereby obtaining $R^{PFPE}$—O—$X^5$—C($Z^3$—O—R—CH=CH$_2$)$_3$. Subsequently, terminal —CH=CH$_2$ is reacted with HSiCl$_3$ and alcohol or HSiR$^{55}{}_3$, and thus $R^{PFPE}$—O—$X^5$—C($Z^3$—O—R—CH$_2$—CH$_2$—SiR$^{55}{}_3$)$_3$ can be obtained.

The above PFPE-containing compound is a compound represented by the following formula.

$$(Rf^1-PFPE)_{\varepsilon 1'}-X-(R^g)_{\varepsilon 1} \quad (1)$$

$Rf^1$ has the same definition as that of $Rf^2$. PFPE is as defined above. Note that PFPE in the PFPE-containing silane compound and PFPE in the PFPE-containing compound contained in the surface-treating agent are optionally the same or different.

In the above formula, X is a di- to deca-valent organic group. The X group is, in a compound represented by the formula (1), construed as a linker for linking a perfluoropolyether portion ($Rf^1$—PFPE- portion) providing mainly water-repellency and surface lubricity, and $R^g$ that is a radical capturing group or a UV absorbing group. Accordingly, the X group may be any organic group, as long as a compound represented by the formula (1) can be stably present.

In the above formula, $\varepsilon 1$ is an integer of 1 to 9, and $\varepsilon 1'$ is an integer of 1 to 9. These $\varepsilon 1$ and $\varepsilon 1'$ may be determined depending on the valence of X. The sum of $\varepsilon 1$ and $\varepsilon 1'$ is the same as the valence of X. For example, when X is a deca-valent organic group, the sum of $\varepsilon 1$ and $\varepsilon 1'$ is 10, and for example, $\varepsilon 1$ is 9 and $\varepsilon 1'$ is 1, $\varepsilon 1$ is 5 and $\varepsilon 1'$ is 5, or $\varepsilon 1$ is 1 and $\varepsilon 1'$ is 9. Furthermore, when X is a divalent organic group, $\varepsilon 1$ and $\varepsilon 1'$ are 1.

The above X is preferably a di- to hepta-valent, more preferably di- to tetra-valent, and further preferably divalent organic group.

In one embodiment, X is a di- to tetra-valent organic group, $\varepsilon 1$ is between 1 and 3, and $\varepsilon 1'$ is 1.

In another embodiment, X is a divalent organic group, $\varepsilon 1$ is 1, and $\varepsilon 1'$ is 1. In this case, the formula (1) is represented by the following formula (1').

$$Rf^1-PFPE-X-R^g \quad (1')$$

Examples of the above X include, but are not limited to, those similar to examples described for $X^1$.

Particularly preferable specific examples of the X include
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O((CH$_3$)$_2$O)$_{20}$Si(CH$_3$)$_2$(CH$_2$)$_2$,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$)CF$_2$OCF$_2$—,
—CH$_2$OCH$_2$CF$_2$CF$_2$OCF(CF$_3$)CF$_2$OCF$_2$CF$_2$—,
—CH$_2$OCH$_2$CF$_2$CF$_2$OCF(CF$_3$)CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$)CF$_2$OCF$_2$—,
—CH$_2$OCH$_2$CHFCF$_2$OCF(CF$_3$)CF$_2$OCF$_2$CF$_2$—,
—CH$_2$OCH$_2$CHFCF$_2$OCF(CF$_3$)CF$_2$OCF$_2$CF$_2$CF$_2$—,
—CH$_2$OCH$_2$(CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—CH$_2$—,
—(CH$_2$)$_2$—,
—(CH$_2$)$_3$—,
—(CH$_2$)$_4$—,
—(CH$_2$)$_5$—,
—(CH$_2$)$_6$—,
—CO—,
—CONH—,
—CONH—CH$_2$—,
—CONH—(CH$_2$)$_2$—,
—CONH—(CH$_2$)$_3$—,
—(CH$_2$)$_2$—Si(CH$_3$)$_2$—(CH$_2$)$_2$—,
—CON(CH$_3$)—(CH$_2$)$_3$—,
—CON(Ph)-(CH$_2$)$_3$— wherein Ph denotes phenyl,
—CONH—(CH$_2$)$_6$—,
—CON(CH$_3$)—(CH$_2$)$_6$—,
—CON(Ph)-(CH$_2$)$_6$— wherein Ph denotes phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

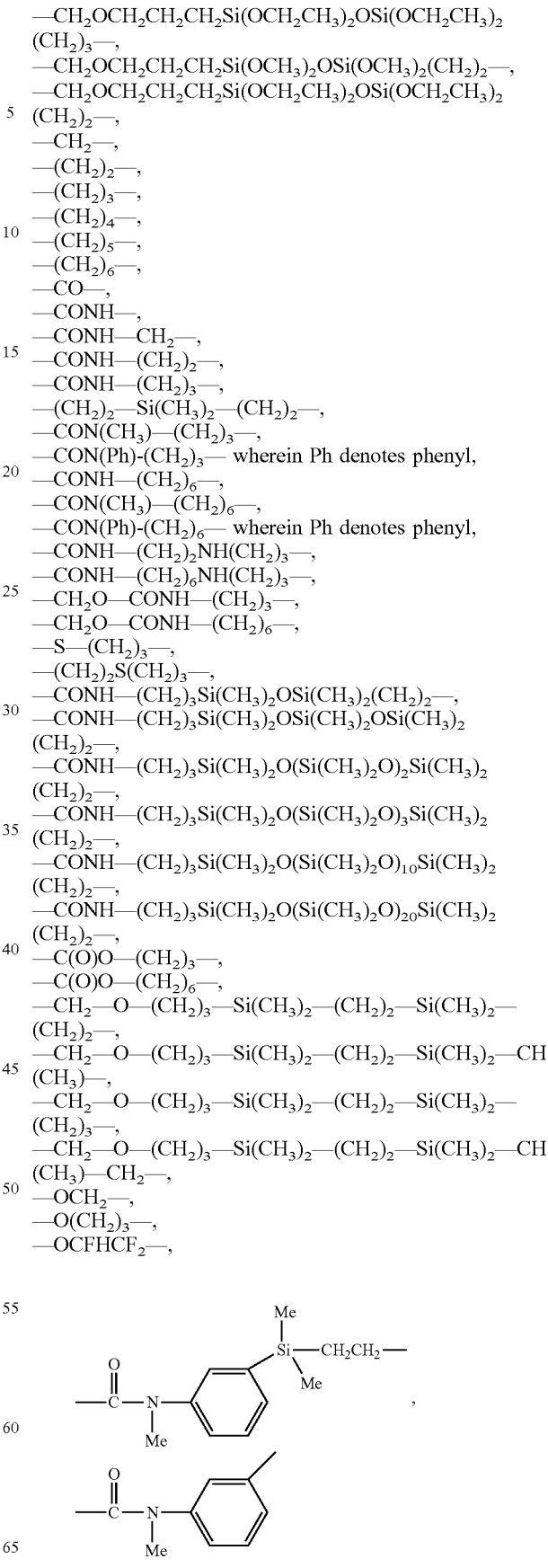

In the above formula, $R^g$ is a radical capturing group or a UV absorbing group.

Examples of the radical capturing group are not limited, as long as they can capture radicals generated by photoirradiation, particularly UV irradiation, and include residues of benzophenones, benzotriazoles, benzoic acid esters, phenyl salicylates, crotonic acids, malonic acid esters, organoacrylates, hindered amines, hindered phenols or triazines. A radical capturing group is particularly preferably a residue of hindered amines.

The above "residue" is a group derived from benzophenones, benzotriazoles, benzoic acid esters, phenyl salicylates, crotonic acids, malonic acid esters, organoacrylates, hindered amines, hindered phenols or triazines, and refers to a group from which a portion of the above structures (for example, a hydrogen atom) has eliminated. A residue of hindered amines refers to a structure from which a hydrogen atom at its molecular end of hindered amines has eliminated.

Examples of the UV absorbing group are not limited, as long as they can absorb ultraviolet rays, and include residues of benzotriazoles, hydroxybenzophenones, esters of substituted and unsubstituted benzoic acid or salicylic acid compounds, acrylate or alkoxycinnamates, oxamides, oxanilides, benzoxazinones, and benzoxazoles.

The above "residue" is a group derived from benzotriazoles, hydroxybenzophenones, esters of substituted and unsubstituted benzoic acid or salicylic acid compounds, acrylate or alkoxycinnamates, oxamides, oxanilides, benzoxazinones, or benzoxazoles, and refers to a group from which a portion of the above structures (for example, a hydrogen atom) has eliminated.

As preferable $R^g$, $R^g$ capable of functioning as an antioxidant or a polymerization inhibitor is used, and examples thereof include the following groups:

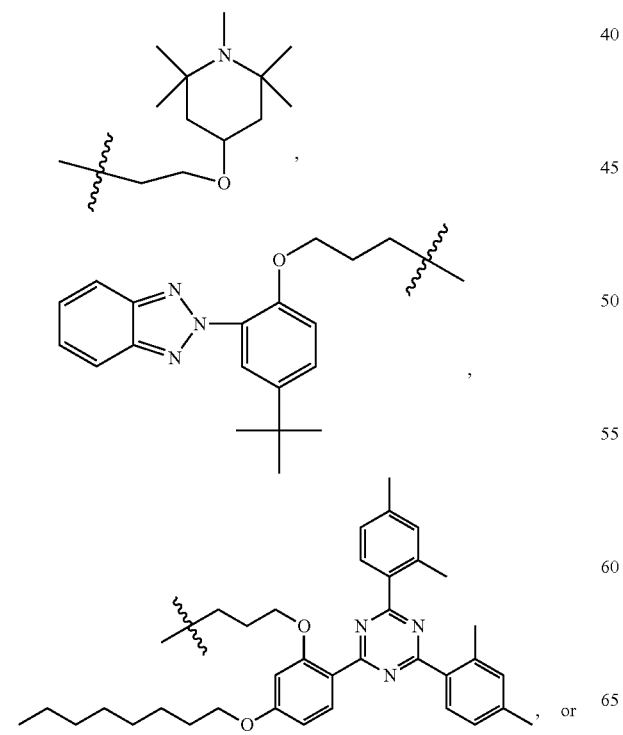

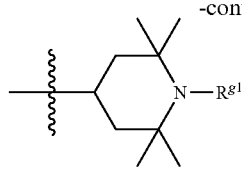

or, groups derived from the following compounds:

α-tocopherol, (+)-catechin, quercetin, vitamin C, glutathione, 5,5-dimethyl-1-pyrroline-N-oxide, phenothiazine, distearyl thiodipropionate, p-phenylenediamine, 4-aminodiphenylamine, N,N'-diphenyl-p-phenylenediamine, N-i-propyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-β-naphthylamine, 4,4'-dicumyl-diphenylamine, 4,4'-dioctyl-diphenylamine, N-nitrosodiphenylamine, N-nitrosophenylnaphthylamine, N-nitrosodinaphthylamine, p-nitrosophenol, nitrosobenzene, p-nitrosodiphenylamine, α-nitroso-β-naphthol, piperidine-1-oxyl, pyrrolidine-1-oxyl, 2,2,6,6-tetramethyl-4-oxopiperidine-1-oxyl, 2,2,6,6-tetramethylpiperidine-1-oxyl, hydroquinone, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), dinitrocresol, α-pinene, α-terpinen, 1,4-cineol, D-limonene, 1,8-cineol, γ-terpinen, p-cymene and terpinolene. These compounds may bind to $(Rf^1-PFPE)_{\epsilon 1}$-X— via a functional group existing within the molecule of the compounds (hydroxyl group, amino group, carboxyl group or thiol group) or a carbon atom of CH, $CH_2$ or $CH_3$ group (specifically, a carbon atom after reduction of hydrogen atoms of CH, $CH_2$ or $CH_3$ group).

In the above formula, $R^{g1}$ is a hydrogen atom, an alkyl group having 1 to 6 carbon atoms, or a phenyl group, and preferably a methyl group.

Examples of more preferable $R^g$ can include the following groups. In the above formula, $R^{g1}$ is as defined above.

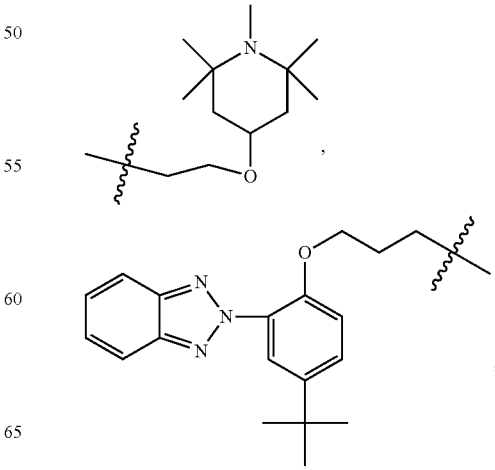

-continued

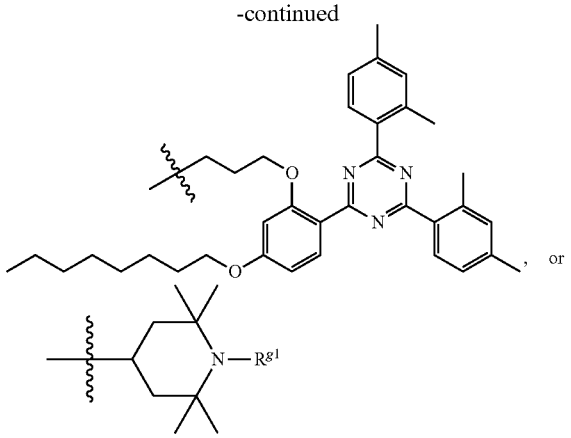

, or

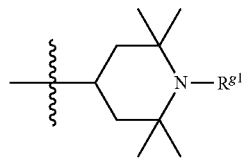

$R^g$ is particularly preferably a group represented by the following formula (2).

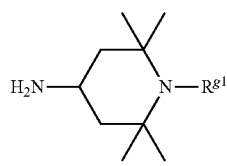
(2)

wherein $R^{g1}$ is as defined above.

The surface-treating agent of the present invention contains a compound having $R^4$, and thus can contribute to the formation of a surface-treating layer having good UV resistance.

The PFPE-containing compound can be produced by the method described below, for example.

The following production method comprises a step of mixing a compound represented by the formula (2a) and a compound represented by the formula (2b), so as to obtain a product containing a compound represented by the formula (2c).

$Rf^1$-PFPE-CONR$^8$ (2a)

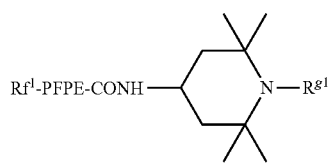
(2b)

(2c)

$Rf^1$-PFPE-CONH— wherein $R^8$ is an alkoxy group having 1 to 6 carbon atoms, or a halogen atom, and preferably a methoxy group, and $R^{g1}$, $Rf^1$ and PFPE are as defined above.

In the above step, the mixing ratio (molar ratio) of compound (2a) and compound (2b) ranges from, for example, 1:0.80 to 1:10.

In the above step, a reaction solvent is not limited, and for example, 1,3-bis(trifluoromethyl)benzene, perfluorobutylethylether and perfluorohexylmethylether may be used.

In the above step, the reaction temperature is not limited and for example, a reaction can be performed at temperatures ranging from 20° C. to 150° C.

After the above step, the method may further comprise a step of adding a solvent for extraction, such as perfluorohexane and methanol to the product obtained in the above step, so as to extract a compound represented by the formula (2c).

The PFPE-containing compound may have a mean molecular weight of 1,000 to 50,000, but the example thereof is not limited thereto. Within such a range of mean molecular weights, the PFPE-containing compound having a mean molecular weight of 2,000 to 20,000, preferably 2,000 to 10,000, and more preferably 2,000 to 8,000 is preferable in view of improvement in friction resistance of the thus formed surface-treating layer. The above "mean molecular weight" refers to a number average molecular weight, and is measured by $^{19}$F-NMR and $^1$H-NMR.

In a preferred embodiment, when a surface-treating layer is formed by a vacuum deposition method, the PFPE-containing compound may have a number average molecular weight higher than that of the PFPE-containing silane compound. For example, the PFPE-containing compound may have a number average molecular weight higher than that of the PFPE-containing silane compound by 2,000 or more, preferably 3,000 or more, and more preferably 5,000 or more. With such a number average molecular weight, better friction durability and better UV resistance can be obtained. In particular, with the above number average molecular weight, the PFPE compound having a radical capturing group or a UV absorbing group may present in the vicinity of the surface of the surface-treating layer, and thus can contribute to improvement in UV resistance of the surface-treating layer.

Preferably 0.001 to 50 parts by mass, and more preferably 0.01 to 10 parts by mass of the PFPE-containing compound is contained per 100 parts by mass of the surface-treating agent of the present invention. The PFPE-containing compound is contained in an amount within the above range, so that the surface-treating agent of the present invention may contribute to keep up the friction resistance and UV resistance of the thus formed surface-treating layer.

The surface-treating agent of the present invention may be diluted with a solvent. Examples of such a solvent include, but are not limited to: fluorine atom-containing solvents selected from the group consisting of perfluorohexane, $CF_3CF_2CHCl_2$, $CF_3CH_2CF_2CH_3$, $CF_3CHFCHFC_2F_5$, 1,1,1,2,2,3,3,4,4,5,5,6,6-tridecafluorooctane, 1,1,2,2,3,3,4-heptafluorocyclopentane (e.g., ZEORORA H (trade name)), $C_4F_9OCH_3$, $C_4F_9OC_2H_5$, $CF_3CH_2OCF_2CHF_2$, $C_6F_{13}CH=CH_2$, xylenehexafluoride, perfluorobenzene, methylpentadecafluoroheptyl ketone, trifluoroethanol, pentafluoropropanol, hexafluoroisopropanol, $HCF_2CF_2CH_2OH$, methyl trifluoromethanesulfonate, trifluoroacetic acid and $CF_3O(CF_2CF_2O)_m(CF_2O)_nCF_2CF_3$ wherein m and n are each independently an integer of 0 or more and 1,000 or less, the occurrence order of the respective repeating units in parentheses with the subscript m or n is not limited in the formula, and the sum of m and n is 1 or more, 1,1-dichloro-2,3,3,3-tetrafluoro-1-propene, 1,2-dichloro-1,3,3,3-tetrafluoro-1-propene, 1,2-dichloro-3,3,3-trifluoro-1-propene, 1,1-dichloro-3,3,3-trifluoro-1-propene, 1,1,2-trichloro-3,3,3-trifluoro-1-propene and 1,1,1,4,4,4-hexafluoro-2-butene.

The water content of the solvent is preferably 20 ppm or less in terms of mass. The water content is measured using Karl Fischer technique. Such a water content may improve the preservation stability of the surface-treating agent.

The surface-treating agent of the present invention may further contain other components. Examples of such other components include, but are not limited to, other surface-treating compounds, a (non-reactive) fluoropolyether compound that can be understood as a fluorine-containing oil, preferably a perfluoro(poly)ether compound (hereinafter, also referred to as a "fluorine-containing oil"), a (non-reactive) silicone compound that can be understood as a silicone oil (hereinafter, also referred to as a "silicone oil"), and a catalyst.

Examples of the fluorine-containing oil include, but are not limited to, a compound (perfluoro(poly)ether compound) represented by the following general formula (3).

(3)

In the formula, $Rf^5$ represents an alkyl group having 1 to 16 carbon atoms (preferably, a $C_{1-16}$ perfluoroalkyl group), optionally substituted with one or more fluorine atoms, $Rf^6$ represents an alkyl group having 1 to 16 carbon atoms (preferably, a $C_{1-16}$ perfluoroalkyl group), optionally substituted with one or more fluorine atoms, a fluorine atom or a hydrogen atom, and $Rf^5$ and $Rf^6$ are more preferably each independently a $C_{1-3}$ perfluoroalkyl group.

a', b', c' and d' represent the numbers of 4 types of repeating units of perfluoro(poly)ether composing the main chains of polymers, and are each independently from each other an integer of 0 or more and 300 or less, and the sum of a', b', c' and d' is at least 1, ranges from preferably 1 to 300, and more preferably 20 to 300. The occurrence order of the respective repeating units in parentheses with the subscript a', b', c' or d' is not limited in the formula. Of these repeating units, —(OC$_4$F$_8$)— may be any one of —(OCF$_2$CF$_2$CF$_2$CF$_2$)—, —(OCF(CF$_3$)CF$_2$CF$_2$)—, —(OCF$_2$CF(CF$_3$)CF$_2$)—, —(OCF$_2$CF$_2$CF(CF$_3$))—, —(OC(CF$_3$)$_2$CF$_2$)—, —(OCF$_2$C(CF$_3$)$_2$)—, —(OCF(CF$_3$)CF(CF$_3$))—, —(OCF(C$_2$F$_5$)CF$_2$)— and —(OCF$_2$CF(C$_2$F$_5$))—, and is preferably —(OCF$_2$CF$_2$CF$_2$CF$_2$)—, —(OC$_3$F$_6$)— may be any one of —(OCF$_2$CF$_2$CF$_2$)—, —(OCF(CF$_3$)CF$_2$)— and —(OCF$_2$CF(CF$_3$))—, and is preferably —(OCF$_2$CF$_2$CF$_2$)—. —(OC$_2$F$_4$)— may be any one of —(OCF$_2$CF$_2$)— and —(OCF(CF$_3$))—, and is preferably —(OCF$_2$CF$_2$)—.

Examples of the perfluoro(poly)ether compound represented by the general formula (3) include a compound (which may be one type or two or more types of mixture) represented by the following general formula (3a) or (3b).

(3a)

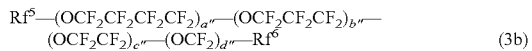
(3b)

In these formulae, $Rf^5$ and $Rf^6$ are as defined above;

in the formula (3a), b" is an integer of 1 or more and 100 or less; in the formula (3b), a" and b" are each independently an integer of 1 or more and 30 or less, and c" and d" are each independently an integer of 1 or more and 300 or less. The occurrence order of the respective repeating units in parentheses with the subscript a", b", c" or d" is not limited in the formula.

The fluorine-containing oil may have a mean molecular weight of 1,000 to 30,000. Therefore, high surface lubricity may be obtained.

In the surface-treating agent of the present invention, 0 to 500 parts by mass, preferably 0 to 400 parts by mass, and more preferably 5 to 300 parts by mass of the fluorine-containing oil may be contained, for example, relative to a total of 100 parts by mass (in the case of two or more compounds, the total content thereof is taken into consideration, and the same applies to the following) of the PFPE-containing silane compound and the PFPE-containing compound.

A compound represented by the general formula (3a) and a compound represented by the general formula (3b) may be used independently or in combination. The use of the compound represented by the general formula (3b) is more preferable than the use of the compound represented by the general formula (3a), since higher surface lubricity can be obtained. When these compounds are used in combination, the mass ratio of the compound represented by the general formula (3a) and the compound represented by the general formula (3b) ranges from preferably 1:1 to 1:30, and more preferably 1:1 to 1:10. With such a mass ratio, a surface-treating layer having a well-balanced combination of surface lubricity and friction durability can be obtained.

In one embodiment, the fluorine-containing oil contains one or more compounds represented by the general formula (3b). In such an embodiment, the mass ratio of a total of the PFPE-containing silane compound and the PFPE-containing compound, and the compound represented by the formula (3b) in the surface-treating agent preferably ranges from 10:1 to 1:10, and preferably 4:1 to 1:4.

In a preferred embodiment, when the surface-treating layer is formed by a vacuum deposition method, the fluorine-containing oil may have a mean molecular weight higher than that of the PFPE-containing silane compound and the PFPE-containing compound. With such a mean molecular weight, better friction durability and better surface lubricity can be obtained.

Furthermore, from another viewpoint, the fluorine-containing oil may be a compound represented by the general formula Rf'—F wherein Rf' is a $C_{5-16}$ perfluoroalkyl group. The fluorine-containing oil may also be a chlorotrifluoroethylene oligomer. The compound represented by Rf'—F and the chlorotrifluoroethylene oligomer are preferable in that high affinity for the PFPE-containing silane compound and the PFPE-containing compound (wherein $Rf^1$ is a $C_{1-16}$ perfluoroalkyl group) is obtained.

The fluorine-containing oil contributes to improvement in the surface lubricity of the surface-treating layer.

As the silicone oil, for example, a linear or cyclic silicone oil having a siloxane bond of 2,000 or less may be used. A linear silicone oil may be namely a straight silicone oil and a denatured silicone oil. Examples of the straight silicone oil include a dimethylsilicone oil, a methylphenylsilicone oil and methylhydrogen silicone oil. Examples of the denatured silicone oil include those prepared by denaturation of a straight silicone oil with alkyl, aralkyl, polyether, higher fatty acid ester, fluoroalkyl, amino, epoxy, carboxyl, alcohol and the like. Examples of the cyclic silicone oil include a cyclic dimethylsiloxane oil.

In the surface-treating agent of the present invention, 0 to 300 parts by mass, and preferably 0 to 200 parts by mass of such a silicone oil may be contained relative to a total of 100 parts by mass (in the case of two or more compounds, the total content thereof is taken into consideration, and the same applies to the following) of the PFPE-containing silane compound and the PFPE-containing compound.

A silicone oil contributes to improvement in the surface lubricity of the surface-treating layer.

Examples of the catalyst include an acid (for example, acetic acid and trifluoroacetic acid), a base (for example, ammonia, triethylamine and diethylamine) and a transition metal (for example, Ti, Ni and Sn).

A catalyst accelerates the hydrolysis and dehydration condensation of the PFPE-containing silane compound, thereby accelerating the formation of the surface-treating layer.

Examples of other components include, in addition to the above examples, an alcohol compound having 1 to 6 carbon atoms.

The surface-treating agent of the present invention may be in the form of one solution (or suspension or dispersion), or the form of different solutions: a solution of the PFPE-containing silane compound and a solution of the PFPE-containing compound which are mixed immediately before use.

The surface-treating agent of the present invention is impregnated into a porous material including a porous ceramic material, and metal fiber, such as a steel wool material solidifying a steel wool to obtain a pellet. The pellets can be used in vacuum deposition, for example.

The surface-treating agent of the present invention can impart water-repellency, oil-repellency, antifouling property, waterproof property and high friction durability to a base material, and thus can be suitably used as a surface-treating agent. Specifically, the surface-treating agent of the present invention can be suitably used as an antifouling coating agent or a water-proof coating agent, but the examples of its application are not limited.

(Article)

Next, the article of the present invention is described below.

The article of the present invention comprises a base material and a layer (surface-treating layer) formed of the surface-treating agent of the present invention on the surface of the base material. The article can be produced as follows, for example.

First, a base material is provided. A base material that may be used for the present invention may be composed of a suitable material such as glass, a resin (which may be a natural or synthetic resin, such as a general plastic material, and may be in the form of plate or film or other forms), a metal (which may be a simple substance such as aluminum, copper or iron, or a complex such as an alloy), a ceramic, a semiconductor (e.g., silicon and germanium), a fiber (e.g., fabric and nonwoven fabric), a fur, a leather, a wood, a pottery, a stone and an architectural member.

As the above glass, sapphire glass, soda lime glass, alkali aluminosilicate glass, borosilicate glass, alkali-free glass, crystal glass and quartz glass are preferable, and chemically strengthening soda lime glass, chemically strengthening alkali aluminosilicate glass and chemically bound borosilicate glass are particularly preferable.

As the resin, an acrylic resin and polycarbonate are preferable.

For example, when an article to be produced is an optical member, materials for composing the surface of a base material may be materials for the optical member, for example, glass or transparent plastic. Moreover when an article to be produced is an optical member, any of layer (or film), for example, a hard coat layer or an antireflection layer may be formed on the surface (outermost layer) of the base material. For the antireflection layer, any one of a single-layered antireflection layer and a multiple-layered antireflection layer may be used. Examples of the inorganic matter that may be used for the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$ and $WO_3$. These inorganic matters may be used independently or two or more thereof may be used in combination (for example, as a mixture). In the case of multiple-layered antireflection layer, $SiO_2$ and/or $SiO$ is preferably used for the outermost layer. When an article to be produced is an optical glass part for a touch panel, it may have a transparent electrode, for example, a thin film produced comprising indium tin oxide (ITO), indium zinc oxide or the like on a part of the surface of the base material (glass). Furthermore, the base material may have, according to its specific specification, etc., an insulating layer, an adhesive layer, a protecting layer, a decorated frame layer (I—CON), an atomization film layer, a hard coating layer, a polarizing film, a phase difference film and a liquid crystal display module, for example.

The shape of the base material is not limited. Moreover, the region of the surface of the base material on which the surface-treating layer should be formed may be at least a part of the surface of the base material, and may be determined as appropriate depending on the application, specific specification etc., of an article to be produced.

Such a base material may be a base material in which at least its surface portion comprises a material originally having a hydroxyl group. Examples of such a material include a glass, and a metal on which a natural oxidized firm or thermal oxidized film is formed (particularly, base metal), a ceramic and a semiconductor. Alternatively, in a case of a resin or the like which has a hydroxyl group but not sufficient or a case which does not originally have a hydroxyl group, a hydroxyl group can be introduced onto or increased on the surface of the base material by subjecting the base material to any pretreatment. Examples of such pretreatment include plasma treatment (for example, corona discharge) and ion beam irradiation. Plasma treatment can introduce or increase a hydroxyl group on the surface of the base material, and can be suitably used for cleaning the surface of the base material (for removing foreign matter and the like). Furthermore, another example of such pretreatment is a method that involves forming in advance a monomolecular film of an interfacial absorbent having a carbon-carbon unsaturated bond group on the surface of a base material by an LB method (Langmuir-Blodgett technique), chemisorption method or the like, and then cleaving an unsaturated bond under an atmosphere containing oxygen, nitrogen and the like.

Alternatively, such a base material may be a base material in which at least its surface part consists of a material comprising other reactive group, such as a silicone compound having one or more Si—H groups, and alkoxysilane.

Next, the above film of the surface-treating agent of the present invention is formed on the surface of such a base material, and then the film is subjected to post-treatment as necessary, thereby forming the surface-treating layer from the surface-treating agent of the present invention.

The film of the surface-treating agent of the present invention can be formed by applying the surface-treating agent of the present invention to the surface of the base material, so as to coat the surface. The coating method is not limited. For example, a wet coating method and a dry coating method can be used.

Examples of the wet coating method include dip coating, spin coating, flow coating, spray coating, roll coating, gravure coating and similar method.

Examples of the dry coating method include deposition (generally, vacuum deposition), sputtering, CVD and similar method. Specific examples of the deposition method (generally, vacuum deposition method) include resistance heating, high-frequency heating using electron beam, microwave or the like, ion beam and analogous methods. Specific examples of CVD method include plasma-CVD, optical CVD, thermal CVD and similar method.

Additionally, coating can also be performed by an atmospheric pressure plasma method.

When the wet coating method is used, the surface-treating agent of the present invention is diluted with a solvent and then can be applied to the surface of a base material. In view of the stability of the surface-treating agent of the present invention and the volatility of a solvent, the following solvents are preferably used: $C_{5-12}$ perfluoroaliphatic hydrocarbon (for example, perfluorohexane, perfluoromethylcyclohexane and perfluoro-1,3-dimethylcyclohexane); polyfluoroaromatic hydrocarbon (for example, bis(trifluoromethyl)benzene); polyfluoroaliphatic hydrocarbon (for example, $C_6F_{13}CH_2CH_3$ (for example, ASAHIKLIN (registered trademark) AC-6000 manufactured by Asahi Glass Co., Ltd.), 1,1,2,2,3,3,4-heptafluorocyclopentane (for example, ZEORORA (registered trademark) H manufactured by Nippon ZEON Co., Ltd.); hydrofluorocarbon (HFC) (for example, 1,1,1,3,3-pentafluorobutane (HFC-365mfc)); hydrochlorofluorocarbon (for example, HCFC-225 (ASAHIKLIN (registered trademark) AK225)); alkylperfluoroalkylethers (a perfluoroalkyl group and an alkyl group may be linear or branched) such as hydrofluoroether (HFE) (for example, perfluoropropylmethylether $(C_3F_7OCH_3)$ (for example, Novec (trade name) 7000 manufactured by Sumitomo 3M Limited), perfluorobutylmethylether $(C_4F_9OCH_3)$ (for example, Novec (trade name) 7100 manufactured by Sumitomo 3M Limited), perfluorobutylethylether $(C_4F_9OC_2H_5)$ (for example, Novec (trade name) 7200 manufactured by Sumitomo 3M Limited) and perfluorohexylmethylether $(C_2F_5CF(OCH_3)C_3F_7)$ (for example, Novec (trade name) 7300 manufactured by Sumitomo 3M Limited), or $CF_3CH_2OCF_2CHF_2$ (for example, ASAHIKLIN (registered trademark) AE-3000 manufactured by Asahi Glass Co., Ltd.), and 1,2-dichloro-1,3,3,3-tetrafluoro-1-propene (for example, VERTREL (registered trademark) Sion manufactured by Du Pont-Mitsui Fluorochemicals Co. Ltd.), for example. These solvents can be independently used or two or more of these solvents can be used in combination as a mixture. Furthermore, for example, the surface-treating agent can also be mixed with another solvent in order to adjust the solubility of the perfluoro(poly)ether group-containing silane compound and the perfluoro(poly)ether group-containing compound, for example.

When the dry coating method is used, the surface-treating agent of the present invention may be directly subjected to the dry coating method, or the surface-treating agent of the present invention may be diluted with the above solvent and then subjected to the dry coating method.

Film formation is preferably performed in such a manner that the surface-treating agent of the present invention coexists with a catalyst for hydrolysis and dehydration condensation in the coating. Conveniently, in the case of the wet coating method, the surface-treating agent of the present invention is diluted with a solvent, and then a catalyst may be added to the dilute solution of the surface-treating agent of the present invention immediately before application to the surface of a base material. In the case of the dry coating method, the surface-treating agent of the present invention, to which a catalyst has been added, is directly treated by deposition (generally, vacuum deposition), or pellets may be used in the deposition (usually, the vacuum deposition), wherein the pellets is obtained by impregnating a porous metal such as iron or copper with the surface-treating agent of the present invention to which the catalyst has been added.

Any suitable acid or base can be used as a catalyst. As an acid catalyst, for example, acetic acid, formic acid or trifluoroacetic acid, or the like can be used. As a base catalyst, for example, ammonia or organic amines, or the like can be used.

Next, the film is subjected to post-treatment, as necessary. The post-treatment is not limited and may be performed by, for example, performing water supply and dry heating sequentially, and more specifically may be performed as follows.

After the film of the surface-treating agent of the present invention is formed on the surface of the base material as described above, water is supplied to the film (hereinafter, also referred to as "precursor film"). A method for supplying water is not limited. For example, a method that involves condensation using a temperature difference between a precursor film (and base material) and ambient atmosphere or spraying of water vapor (steam) may be used.

Water can be supplied under an atmosphere at 0° C. to 250° C., preferably 60° C. or higher, and further preferably 100° C. or higher, and preferably 180° C. or lower, and further preferably 150° C. or lower, for example. Water supply at a temperature within such a temperature range makes it possible for hydrolysis to proceed. Pressure at this time is not limited and atmospheric pressure can be conveniently employed.

Next, the precursor film is heated on the surface of the base material under a dry atmosphere at a temperature higher than 60° C. A dry heating method is not limited, whereby the precursor film is placed with the base material under an atmosphere of unsaturated vapor pressure at a temperature higher than 60° C., and preferably higher than 100° C., such as 250° C. or lower, and preferably 180° C. or lower. Pressure at this time is not limited and atmospheric pressure can be conveniently employed.

Under such an atmosphere, between the perfluoro(poly)ether group-containing silane compounds of the present invention, the groups bonding to Si after hydrolysis are rapidly dehydration condensation with each other. Moreover, between such compounds and the base material, groups bonding to Si after hydrolysis of the compound rapidly react with reactive groups existing on the surface of the base material. When the reactive groups existing on the surface of the base material are hydroxyl groups, these groups undergo dehydration condensation. As a result, bonds are formed between the perfluoro(poly)ether group-containing silane compound and the base material.

The water supply and dry heating can be performed consecutively by the use of superheated steam.

Post-treatment can be performed as described above. Note that such post-treatment can be performed in order to further improve friction durability, but is not essential for production of the article of the present invention. For example, the surface-treating agent of the present invention may be applied to the surface of a base material and then left to stand.

As described above, the surface-treating layer derived from the film of the surface-treating agent of the present invention is formed on the surface of the base material, and then the article of the present invention is produced. The thus obtained surface-treating layer has high friction durability. Moreover, the surface-treating layer can have water-repellency, oil-repellency, antifouling property (for example, property of preventing the adhesion of stains such as fingerprints), surface slip property (or lubricity, for example, property of wiping off stains such as fingerprints, excellent touch for fingers) and the like, in addition to its high friction durability, depending on the composition of a surface-treating agent to be used, and thus can be suitably used as a functional thin film.

Specifically, the present invention further relates to an optical material having the cured product in the outermost layer.

Examples of the optical material preferably include a variety of optical materials in addition to the optical material for displays, or the like exemplified in below: for example, displays such as a cathode ray tube (CRT; e.g., TV and personal computer monitor), a liquid crystal display, a plasma display, an organic EL display, an inorganic thin-film EL dot matrix display, a rear projection display, a vacuum fluorescent display (VFD) and a field emission display (FED; Field Emission Display), or protective plates of such displays, or that in which these displays and protective plates have been subjected to antireflection treatment on their surface.

An article having the surface-treating layer obtained according to the present invention is not limited, and may be an optical member. Examples of the optical member include the following: lens of glasses, or the like; a front surface protective plate, an antireflection plate, a polarizing plate or anti-glare plate on a display such as PDP and LCD; a touch panel sheet of an instrument such as a mobile phone or a personal digital assistance; a disk surface for optical disks such as a Blu-ray (registered trademark) disk, a DVD disk, CD-R and MO; and an optical fiber.

Furthermore, an article having the surface-treating layer obtained according to the present invention may be medical equipment or a medical material.

The thickness of the surface-treating layer is not limited. In the case of an optical member, the thickness of the surface-treating layer ranges from 1 to 50 nm, preferably 1 to 30 nm, and more preferably 1 to 15 nm in view of optical performance, surface slip property, friction durability and antifouling property.

Articles that are obtained using the surface-treating agent of the present invention are as described in detail above. Note that the applications of and methods for using the surface-treating agent of the present invention, methods for producing such articles, etc., are not limited to those described above.

EXAMPLES

The surface-treating agent of the present invention will be described more specifically with reference to the following Examples, however, the present invention is not limited to these Examples.

Synthesis Example 1

In a 100-mL four-necked flask equipped with a reflux condenser, a thermometer and a stirrer, 10 g of perfluoropolyether modified methylester represented by an average composition of $CF_3CF_2CF_2O(CF_2CF_2CF_2O)_{33}CF_2CF_2C(O)OCH_3$, 10 g of 1,3-bis(trifluoromethyl)benzene, and 0.43 g of the following compound (A) were placed, followed by 8 hours of stirring under a stream of nitrogen at 70° C. After cooling the temperature of the solution within the flask to room temperature, 20 g of perfluorohexane and 10 g of methanol were added to the flask, and then the solution was stirred for 30 minutes. Subsequently, separation was performed to fractionate a perfluorohexane phase. Next, volatile contents were distilled off from the phase under reduced pressure, thereby obtaining 10 g of a perfluoropolyether group-containing compound (B) represented by the following formula having an amino group at its end.

Compound (A):

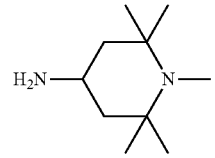

Perfluoropolyether Group-Containing Compound (B):

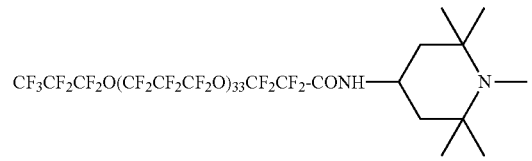

Synthesis Example 2

In a 100-mL four-necked flask equipped with a reflux condenser, a thermometer and a stirrer, 10.0 g of perfluoropolyether modified allyl represented by an average composition of $CF_3O(CF_2CF_2OCF_2CF_2CF_2CF_2O)_{15}CF_2CF_2OCF_2CF_2CF_2CH_2OCH_2CH=CH_2$, 10 g of 1,3-bis(trifluoromethyl)benzene, and 0.75 g of trichlorosilane were placed, followed by 30 minutes of stirring under a stream of nitrogen at 5° C. Next, 0.04 ml of a xylene solution containing a Pt complex of 1,3-divinyl-1,1,3,3-tetramethyl-disiloxane at 2% was added to the flask, and then the temperature of the solution within the flask was increased to 60° C., followed by 3 hours of stirring at this temperature. Subsequently, volatile contents were distilled off from the solution under reduced pressure, thereby obtaining 10.1 g of a perfluoropolyether group-containing silane compound (C) represented by the following formula having trichlorosilane at its end.

Perfluoropolyether Group-Containing Silane Compound (C):
$CF_3O(CF_2CF_2OCF_2CF_2CF_2CF_2O)_{15}CF_2CF_2OCF_2CF_2CF_2CH_2OCH_2CH_2CH_2SiCl_3$ Synthesis Example 3

In a 100-mL four-necked flask equipped with a reflux condenser, a thermometer and a stirrer, 10.1 g of the perfluoropolyether group-containing trichlorosilane compound (C) having trichlorosilane at its end synthesized in Synthesis Example 2, and 10 g of 1,3-bis(trifluoromethyl)benzene were placed, followed by 30 minutes of stirring under a stream of nitrogen at 5° C. Next, 13 ml of a diethylether solution containing allylmagnesium bromide at 0.7 mol/L was added to the flask, and then the temperature of the solution within the flask was increased to room temperature, followed by 10 hours of stirring at this temperature. Subsequently, the temperature of the solution within the flask was cooled to 5° C. Subsequently, 4 ml of methanol was added to the flask, 10 g of perfluorohexane was added, and then the solution was stirred for 30 minutes. Next, a perfluorohexane phase was fractionated using a separating funnel. Next, volatile contents were distilled off from the phase under reduced pressure, thereby obtaining 9.8 g of the following perfluoropolyether group-containing allyl (D) having an allyl group at its end.

Perfluoropolyether Group-Containing Allyl (D):

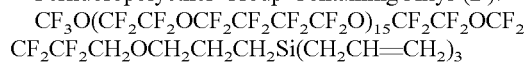
$CF_2CF_2CH_2OCH_2CH_2CH_2Si(CH_2CH=CH_2)_3$

Synthesis Example 4

In a 100-mL four-necked flask equipped with a reflux condenser, a thermometer and a stirrer, 9.8 g of the perfluoropolyether group-containing allyl (D) having an allyl group at its end synthesized in Synthesis Example 3, 12 g of 1,3-bis(trifluoromethyl)benzene, and 1.44 g of trichlorosilane were placed, followed by 30 minutes of stirring under a stream of nitrogen at 5° C. Next, 0.10 ml of a xylene solution containing a Pt complex of 1,3-divinyl-1,1,3,3-tetramethyldisiloxane at 2% was added to the flask, and then the temperature of the solution within the flask was increased to 60° C., followed by 2 hours of stirring at this temperature. Subsequently, volatile contents were distilled off from the solution under reduced pressure, thereby obtaining 10.1 g of the following perfluoropolyether group-containing trichlorosilane compound (E) having trichlorosilane at its end.

Perfluoropolyether Group-Containing Trichlorosilane Compound (E):

$CF_2CF_2CH_2OCH_2CH_2CH_2Si(CH_2CH_2CH_2SiCl_3)_3$

Synthesis Example 5

To a 100-mL four-necked flask equipped with a reflux condenser, a thermometer and a stirrer, 10.1 g of the perfluoropolyether group-containing trichlorosilane compound (E) having trichlorosilane at its end synthesized in Synthesis Example 4, and 10 g of 1,3-bis(trifluoromethyl)benzene were added, followed by 30 minutes of stirring under a stream of nitrogen at 50° C. Next, a mixed solution of 0.30 g of methanol and 5.8 g of trimethyl orthoformate was added to the flask, and then the temperature of the solution within the flask was increased to 55° C., followed by 2 hours of stirring at this temperature. Subsequently, volatile contents were distilled off from the solution under reduced pressure, thereby obtaining 10.0 g of the following perfluoropolyether group-containing silane compound (F) having a trimethylsilyl group at its end.

Perfluoropolyether Group-Containing Silane Compound (F):

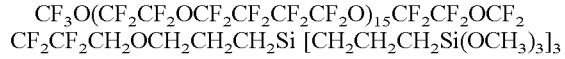
$CF_2CF_2CH_2OCH_2CH_2CH_2Si\,[CH_2CH_2CH_2Si(OCH_3)_3]_3$

Examples 1 to 12 and Comparative Examples 1 to 4

Mixtures or compounds listed in Table 1 below were each dissolved in hydrofluoroether (Novec HFE7200 manufactured by 3M Company) in such a manner that the total concentration thereof was 20 wt %, thereby preparing a surface-treating agent.

Compounds G to I used in Examples and Comparative Examples are as follows.

Compound G

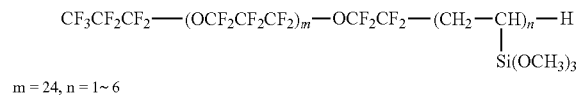
m = 24, n = 1~6

Compound H
$CF_3CF_2CF_2O(CF_2CF_2CF_2O)_{24}CF_2CF_2CH_2OCH_2$
$CH_2CH_2Si\,[CH_2CH_2CH_2Si(OCH_3)_3]_3$ Compound I
$CF_3CF_2CF_2O(CF_2CF_2CF_2O)_{32}CF_2CF_2CH_2OCH_2$
$CH_2CH_2Si\,[CH_2CH_2CH_2Si(OCH_3)_3]_3$ The surface-treating agents prepared above were each deposited on a base material, chemically strengthening glass ("Gorilla" glass manufactured by Corning Incorporated, thickness of 0.7 mm) by vacuum deposition. Vacuum deposition was performed under conditions of pressure of $3.0 \times 10^{-3}$ Pa. First, silicon dioxide was deposited on the surface of the chemically strengthening glass in such a manner that the thickness was 5 nm, so as to form a silicon dioxide film. Next, 2 mg of the surface-treating agent (specifically, in Examples 1 to 4, containing compound (B) and 0.4 mg of the perfluoropolyether group-containing silane compound, and in Comparative Examples 1 to 4, containing 0.4 mg of the perfluoropolyether group-containing silane compound) was deposited per chemically strengthening glass plate (55 mm×100 mm). Subsequently, the chemically strengthening glass plate on which each surface-treating agent had been deposited was heated at a temperature of 150° C. for 30 minutes, and then left to stand under an atmosphere at a temperature of 21° C. and humidity of 65% for 24 hours, thereby forming a surface-treating layer.

TABLE 1

| | Compounds used |
|---|---|
| Example 1 | Mixture of compound F and compound B (compound F:compound B = 100:5.3 (mass ratio)) |
| Example 2 | Mixture of compound G and compound B (compound G:compound B = 100:5.3 (mass ratio)) |
| Example 3 | Mixture of compound H and compound B (compound H:compound B = 100:5.3 (mass ratio)) |
| Example 4 | Mixture of compound I and compound B (compound I:compound B = 100:5.3 (mass ratio)) |
| Example 5 | Mixture of compound F and compound B (compound F:compound B = 100:50 (mass ratio)) |
| Example 6 | Mixture of compound G and compound B compound G:compound B = 100:50 (mass ratio)) |
| Example 7 | Mixture of compound H and compound B (compound H:compound B = 100:50 (mass ratio)) |
| Example 8 | Mixture of compound I and compound B compound I:compound B = 100:50 (mass ratio)) |
| Example 9 | Mixture of compound F and compound B (compound F:compound B = 100:100 (mass ratio)) |
| Example 10 | Mixture of compound G and compound B (compound G:compound B = 100:100 (mass ratio)) |
| Example 11 | Mixture of compound H and compound B (compound H:compound B = 100:100 (mass ratio)) |
| Example 12 | Mixture of compound I and compound B (compound I:compound B = 100:100 (mass ratio)) |
| Comparative Example 1 | Compound F |
| Comparative Example 2 | Compound G |
| Comparative Example 3 | Compound H |
| Comparative Example 4 | Compound I |

(Evaluation)

Measurement of Static Contact Angle

The static contact angles of water on the surface-treating layers obtained in the above Examples 1 to 12 and Comparative Examples 1 to 4 were measured. Each static contact angle of water was measured using a contact angle measuring device (manufactured by Kyowa Interface Science, Co., Ltd.) using 1 µL of water under an environment at 21° C. and 65% humidity.

First, the initial evaluation was made by measuring the static contact angle of water on each surface-treating layer in a state which the surface had not still contacted with anything after formation of the surface-treating layer.

Each surface-treating layer formed on the surface of a base material in the above Examples and Comparative Examples was irradiated with UV using a xenon lamp for 400 hours. Next, the static contact angle of water on the surface-treating layer after UV irradiation was measured. UV irradiation using a xenon lamp was performed at a wavelength of 420 nm and an irradiance of 2.2 W/m$^2$, with a distance between the lamp and the surface of the base material of 10 cm. Measurements of static contact angles, and each percentage of static contact angle of water before UV irradiation relative to the static contact angle of water after UV irradiation (100×static contact angle of water after UV irradiation/static contact angle of water before UV irradiation) are listed in the following table.

TABLE 2

| | Static contact angle (degree) of water before UV irradiation | Static contact angle (degree) of water after UV irradiation | Percentage (%) of static contact angle of water (after UV irradiation/before UV irradiation) |
|---|---|---|---|
| Example 1 | 114 | 114 | 100 |
| Example 2 | 113 | 113 | 100 |
| Example 3 | 115 | 115 | 100 |
| Example 4 | 114 | 114 | 100 |
| Example 5 | 113 | 113 | 100 |
| Example 6 | 111 | 111 | 100 |
| Example 7 | 113 | 113 | 100 |
| Example 8 | 114 | 114 | 100 |
| Example 9 | 103 | 103 | 100 |
| Example 10 | 101 | 101 | 100 |
| Example 11 | 103 | 103 | 100 |
| Example 12 | 105 | 105 | 100 |
| Comparative Example 1 | 114 | 108 | 95 |
| Comparative Example 2 | 113 | 108 | 96 |
| Comparative Example 3 | 115 | 109 | 95 |
| Comparative Example 4 | 115 | 109 | 95 |

Evaluation of Friction Durability

Surface-treating layers before UV irradiation and surface-treating layers after UV irradiation were each subjected to a friction durability test using steel wool. Specifically, each base material on which the surface-treating layer had been formed was arranged horizontally, steel wool (count #0000, size of 5 mm×10 mm×10 mm) was contacted with the exposed top surface of the surface-treating layer, a load of 1,000 gf was applied thereon, and then, the steel wool was reciprocated horizontally at a speed of 140 mm/second with the load applied thereto. The static contact angle (degree) of water on the surface-treating layer was repeatedly measured every 1,000 times of reciprocation frequency until the measured contact angle was less than 100 degrees (repeatedly tested until the measured contact angle was decreased to less than 100 degrees). In Table 3, the reciprocation frequencies of steel wool when the measured contact angles were each decreased to less than 100 degrees are depicted as steel wool durability. Moreover, in Table 3, each percentage of steel wool durability after UV irradiation relative to steel wool durability before UV irradiation (100×steel wool durability after UV irradiation/steel wool durability before UV irradiation) is depicted.

TABLE 3

| | Steel wool durability (times) before UV irradiation | Steel wool durability (times) after UV irradiation | Percentage (%) of steel wool durability (after UV irradiation/before UV irradiation) |
|---|---|---|---|
| Example 1 | 10,000 | 10,000 | 100 |
| Example 2 | 5,000 | 5,000 | 100 |
| Example 3 | 16,000 | 16,000 | 100 |
| Example 4 | 18,000 | 18,000 | 100 |
| Example 5 | 10,000 | 10,000 | 100 |
| Example 6 | 4,000 | 4,000 | 100 |
| Example 7 | 14,000 | 14,000 | 100 |
| Example 8 | 18,000 | 18,000 | 100 |
| Example 9 | 1,000 | 1,000 | 100 |
| Example 10 | 1,000 | 1,000 | 100 |
| Example 11 | 1,000 | 1,000 | 100 |
| Example 12 | 2,000 | 2,000 | 100 |
| Comparative Example 1 | 12,000 | 5,000 | 42 |
| Comparative Example 2 | 5,000 | 2,000 | 40 |
| Comparative Example 3 | 16,000 | 8,000 | 50 |
| Comparative Example 4 | 20,000 | 10,000 | 50 |

No decreases were found in numerical values of the contact angles on the surface-treating layers formed in Examples 1 to 12 before and after UV irradiation (Table 2). It was confirmed by the results in Table 2 that the surface-treating layers formed in Examples 1 to 12 did not easily exhibit decreased water-repellency even after UV irradiation, and exhibited excellent UV resistance. Moreover, it was confirmed by the results in Table 3 that the surface-treating layers of Examples 1 to 12 maintained, even after UV irradiation, steel wool durability equivalent to that before UV irradiation.

Furthermore, numerical values of the contact angles of the surface-treating layers formed in Examples 1 to 8, particularly Examples 1 to 4 were particularly good even before UV irradiation (Table 2). It was confirmed by the results in Table 2 that the surface-treating layers formed in Examples 1 to 8 possessed particularly good water-repellency even before UV irradiation. It was confirmed that the water-repellency was not easily decreased even by UV irradiation, and the surface-treating layers formed in Examples 1 to 8 exhibited excellent UV resistance.

INDUSTRIAL APPLICABILITY

The present invention can be adequately used for the formation of surface-treating layers on the surfaces of a wide variety of base materials, particularly of optical members required to have permeability.

The present invention includes following embodiments:

Embodiment 1

A surface-treating agent comprising:
at least one perfluoro(poly)ether group-containing silane compound selected from the group consisting of the following formulae:

$$(Rf^2-PFPE)_{\alpha 1'}-X^1-((CH_2C)_t-R^{21})_{\alpha 1} \atop {R^{22} \atop X^2-SiR^{23}_{n1}R^{24}_{3-n1}}} \quad (A1)$$

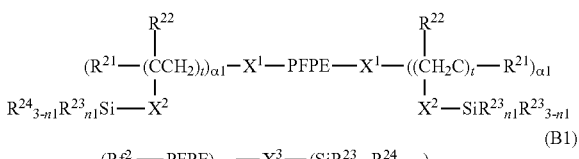
(A2)

$$(Rf^2-PFPE)_{\beta 1'}-X^3-(SiR^{23}_{n1}R^{24}_{3-n1})_{\beta 1} \quad (B1)$$

$$(R^{24}_{3-n1}R^{23}_{n1}Si)_{\beta 1}-X^3-PFPE-X^3-(SiR^{23}_{n1}R^{24}_{3-n1})_{\beta 1} \quad (B2)$$

$$(Rf^2-PFPE)_{\gamma 1'}-X^4-(SiR^{a1}_{k1}R^{b1}_{l1}R^{c1}_{m1})_{\gamma 1} \quad (C1)$$

$$(R^{c1}_{m1}R^{b1}_{l1}R^{a1}_{k1}Si)_{\gamma 1}-X^4-PFPE-X^4-(SiR^{a1}_{k1}R^{b1}_{l1}R^{c1}_{m1})_{\gamma 1} \quad (C2)$$

$$(Rf^2-PFPE)_{\delta 1'}-X^5-(CR^{d1}_{k2}R^{e1}_{l2}R^{f1}_{m2})_{\delta 1} \quad (D1)$$

$$(R^{f1}_{m2}R^{e1}_{l2}R^{d1}_{k2}C)_{\delta 1}-X^5-PFPE-X^5-(CR^{d1}_{k2}R^{e1}_{l2}R^{f1}_{m2})_{\delta 1} \quad (D2)$$

wherein:
PFPE is each independently at each occurrence a group represented by the formula: $-(OC_6F_{12})_a-(OC_5F_{10})_b-(OC_4F_8)_c-(OC_3F_6)_d-(OC_2F_4)_e-(OCF_2)_f-$
wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;

$Rf^2$ represents each independently at each occurrence an alkyl group having 1 to 16 carbon atoms, optionally substituted with one or more fluorine atoms;

$R^{23}$ represents each independently at each occurrence a hydroxyl group or a hydrolyzable group;

$R^{24}$ represents each independently at each occurrence a hydrogen atom or an alkyl group having 1 to 22 carbon atoms;

$R^{21}$ represents each independently at each occurrence a hydrogen atom or a halogen atom;

$R^{22}$ represents each independently at each occurrence a hydrogen atom or a lower alkyl group;

n1 is independently an integer of 0 to 3 per unit $(-SiR^{23}_{n1}R^{24}_{3-n1})$;

where, in each of the formulae (A1), (A2), (B1) and (B2), at least one n1 is an integer of 1 to 3;

$X^1$ represents each independently a single bond or a di- to deca-valent organic group;

X2 represents each independently at each occurrence a single bond or a divalent organic group;

t is each independently at each occurrence an integer of 1 to 10;

α1 is each independently an integer of 1 to 9;
α1' is each independently an integer of 1 to 9;
$X^3$ represents each independently a single bond or a di- to deca-valent organic group;
β1 is each independently an integer of 1 to 9;
β1' is each independently an integer of 1 to 9;
$X^4$ represents each independently a single bond or a di- to deca-valent organic group;
γ1 is each independently an integer of 1 to 9;
γ1' is each independently an integer of 1 to 9;
$R^{a1}$ represents each independently at each occurrence $-Z^1-SiR^{11}_{p1}R^{12}_{q1}R^{13}_{r1}$;
$Z^1$ represents each independently at each occurrence an oxygen atom or a divalent organic group;
$R^{11}$ represents each independently at each occurrence $R^{a1'}$;
$R^{a1'}$ has the same definition as that of $R^{a1}$;
in $R^{a1}$, the number of Si to be linked linearly via a $Z^1$ group is up to 5;
$R^{12}$ represents each independently at each occurrence a hydroxyl group or a hydrolyzable group;
$R^{13}$ represents each independently at each occurrence a hydrogen atom or a lower alkyl group;
p1 is each independently at each occurrence an integer of 0 to 3;
q1 is each independently at each occurrence an integer of 0 to 3;
r1 is each independently at each occurrence an integer of 0 to 3;
where, in each of the formulae (C1) and (C2), at least one q1 is an integer of 1 to 3;
$R^{b1}$ represents each independently at each occurrence a hydroxyl group or a hydrolyzable group;
$R^{c1}$ represents each independently at each occurrence a hydrogen atom or a lower alkyl group;
k1 is each independently at each occurrence an integer of 1 to 3;
l1 is each independently at each occurrence an integer of 0 to 2;
m1 is each independently at each occurrence an integer of 0 to 2;
$X^5$ represents each independently a single bond or a di- to deca-valent organic group;
δ1 is each independently an integer of 1 to 9;
δ1' is each independently an integer of 1 to 9;
$R^{d1}$ represents each independently at each occurrence $-Z^2-CR^{51}_{p2}R^{52}_{q2}R^{53}_{r2}$;
$Z^2$ represents each independently at each occurrence an oxygen atom or a divalent organic group;
$R^{51}$ represents each independently at each occurrence $R^{d1'}$;
$R^{d1'}$ has the same definition as that of $R^{d1}$;
in $R^{d1}$, the number of C to be linked linearly via a $Z^2$ group is up to 5;
$R^{52}$ represents each independently at each occurrence $-Z^3-SiR^{55}_{n2}R^{56}_{3-n2}$;
$Z^3$ represents each independently at each occurrence a divalent organic group;
$R^{55}$ represents each independently at each occurrence a hydroxyl group or a hydrolyzable group;
$R^{56}$ represents each independently at each occurrence a hydrogen atom or a lower alkyl group;
n2 represents independently an integer of 0 to 3 per unit $(-Z^3-SiR^{55}_{n2}R^{56}_{3-n2})$;
where, in each of the formulae (D1) and (D2), at least one n2 is an integer of 1 to 3;

R⁵³ represents each independently at each occurrence a hydrogen atom or a lower alkyl group;

p2 is each independently at each occurrence an integer of 0 to 3;

q2 is each independently at each occurrence an integer of 0 to 3;

r2 is each independently at each occurrence an integer of 0 to 3;

$R^{e1}$ represents each independently at each occurrence $-Z^3-SiR^{55}{}_{n2}R^{56}{}_{3-n2}$, $R^{f1}$ represents each independently at each occurrence a hydrogen atom or a lower alkyl group;

k2 is each independently at each occurrence an integer of 0 to 3;

l2 is each independently at each occurrence an integer of 0 to 3; and m2 is each independently at each occurrence an integer of 0 to 3;

where, in each of the formulae (D1) and (D2), at least one q2 is 2 or 3, or at least one l2 is 2 or 3, and a perfluoro(poly)ether group-containing compound represented by the following formula:

$$(Rf^1-PFPE)_{\epsilon1'}-X-(R^g)_{\epsilon1} \quad (1)$$

wherein $Rf^1$ has the same definition as that of $Rf^2$;

PFPE has the same definition as defined above;

X is a di- to deca-valent organic group;

$R^g$ is a radical capturing group or a UV absorbing group;

ε1 is an integer of 1 to 9; and

ε1' is an integer of 1 to 9.

Embodiment 2

The surface-treating agent according to Embodiment 1, wherein $Rf^1$ and $Rf^2$ are each independently at each occurrence a perfluoroalkyl group having 1 to 16 carbon atoms.

Embodiment 3

The surface-treating agent according to Embodiment 1 or 2, wherein PFPE is independently at each occurrence the following formula (a), (b) or (c):

$$-(OC_3F_6)_d- \quad (a)$$

wherein d is an integer of 1 to 200, $$-(OC_4F_8)_c-(OC_3F_6)_d-(OC_2F_4)_e-(OCF_2)_f- \quad (b)$$

wherein c and d are each independently an integer of 0 or more and 30 or less;

e and f are each independently an integer of 1 or more and 200 or less;

the sum of c, d, e and f is an integer of 10 or more and 200 or less; and the occurrence order of the respective repeating units in parentheses with the subscript c, d, e or f is not limited in the formula, $$-(R^6-R^7)_j- \quad (c)$$

wherein $R^6$ is $OCF_2$ or $OC_2F_4$;

$R^7$ is a group selected from $OC_2F_4$, $OC_3F_6$, $OC_4F_8$, $OC_5F_{10}$ and $OC_6F_{12}$, or a combination of two or three groups selected from these groups; and j is an integer of 2 to 100.

Embodiment 4

The surface-treating agent according to any one of Embodiments 1 to 3, wherein $R^g$ is at least one residue selected from the group consisting of residues of benzophenones, benzotriazoles, benzoic acid esters, phenyl salicylates, crotonic acids, malonic acid esters, organoacrylates, hindered amines, hindered phenols, triazines, hydroxybenzophenones, esters of a substituted and unsubstituted benzoic acid or salicylic acid compound, acrylate or alkoxycinnamates, oxamides, oxanilides, benzoxazinones, and benzoxazoles.

Embodiment 5

The surface-treating agent according to any one of Embodiments 1 to 4, wherein $R^g$ is a group represented by

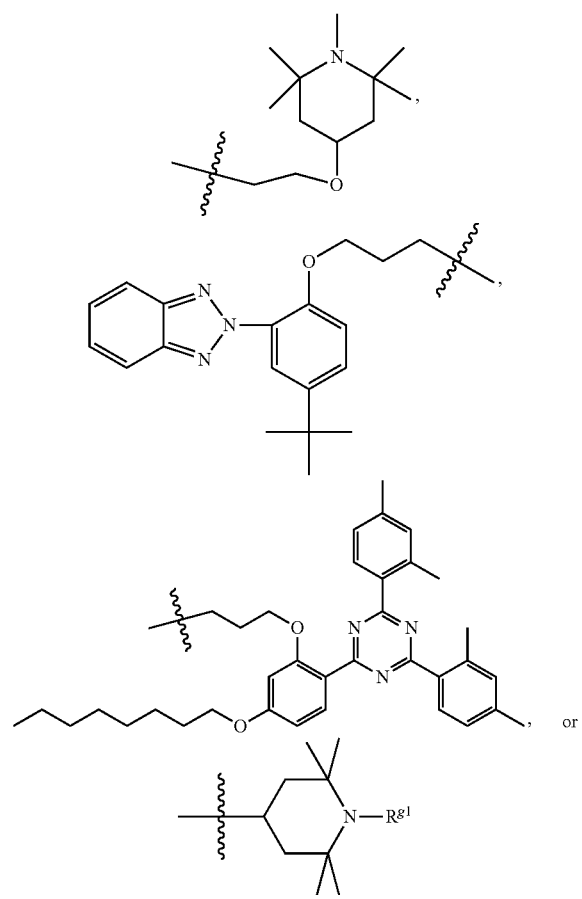

wherein $R^{g1}$ is a hydrogen atom, an alkyl group having 1 to 6 carbon atoms, or a phenyl group.

Embodiment 6

The surface-treating agent according to any one of Embodiments 1 to 5, wherein X is a divalent organic group.

Embodiment 7

The surface-treating agent according to any one of Embodiments 1 to 6, wherein $X^1$, $X^3$, $X^4$ and $X^5$ are each independently at each occurrence a divalent organic group.

Embodiment 8

The surface-treating agent according to any one of Embodiments 1 to 7, wherein the perfluoro(poly)ether group-containing silane compound and the perfluoro(poly)ether group-containing compound are contained at a mass ratio ranging from 100:0.001 to 100:110.

Embodiment 9

The surface-treating agent according to any one of Embodiments 1 to 8, wherein the number average molecular weights of an Rf$^1$-PFPE portion and an Rf$^2$-PFPE portion each independently range from 500 to 30,000.

Embodiment 10

The surface-treating agent according to any one of Embodiments 1 to 9, wherein the number average molecular weight of the perfluoro(poly)ether group-containing compound ranges from 2,000 to 8,000.

Embodiment 11

The surface-treating agent according to any one of Embodiments 1 to 10, further comprising one or more other components selected from a fluorine-containing oil, a silicone oil and a catalyst.

Embodiment 12

The surface-treating agent according to any one of Embodiments 1 to 11, further comprising a solvent.

Embodiment 13

The surface-treating agent according to any one of Embodiments 1 to 12, which is used as an antifouling coating agent or a water-proof coating agent.

Embodiment 14

The surface-treating agent according to any one of Embodiments 1 to 13, used for vacuum deposition.

Embodiment 15

A pellet comprising a surface-treating agent according to any one of Embodiments 1 to 14.

Embodiment 16

An article comprising a base material, and a layer formed of a surface-treating agent according to any one of Embodiments 1 to 14 on the surface of the base material.

Embodiment 17

The article according to Embodiment 16, which is an optical member.

Embodiment 18

The article according to Embodiment 16 or 17, which is a display.

The invention claimed is:
1. A surface-treating agent comprising:
at least one perfluoro(poly)ether group-containing silane compound of any one of the following formulae:

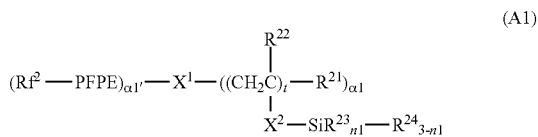

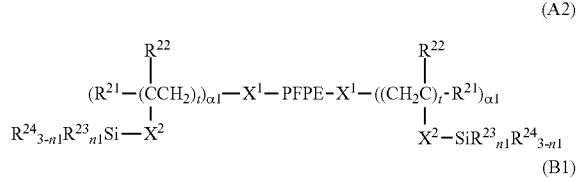

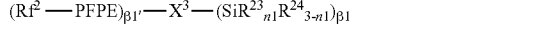

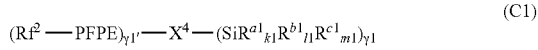

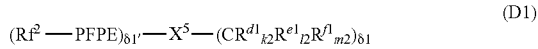

and
a perfluoro(poly)ether group-containing compound represented by the following formula:

    (1)

wherein:
in the formulae (A1), (A2), (B1), (B2), (C1), (C2), (D1) and (D2);
PFPE is each independently at each occurrence a group represented by the formula:

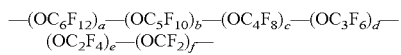

wherein a, b, c, d, e and f are each independently an integer of 0 or more and 200 or less, the sum of a, b, c, d, e and f is at least 1, and the occurrence order of the respective repeating units in parentheses with the subscript a, b, c, d, e or f is not limited in the formula;
Rf$^2$ represents each independently at each occurrence an alkyl group having 1 to 16 carbon atoms, optionally substituted with one or more fluorine atoms;
R$^{23}$ represents each independently at each occurrence a hydroxyl group or a hydrolyzable group;
R$^{24}$ represents each independently at each occurrence a hydrogen atom or an alkyl group having 1 to 22 carbon atoms;
R$^{21}$ represents each independently at each occurrence a hydrogen atom or a halogen atom;
R$^{22}$ represents each independently at each occurrence a hydrogen or a C$_{1-20}$ group;
n1 is independently an integer of 0 to 3 per unit (—SiR$^{23}_{n1}$R$^{24}_{3-n1}$);
where, in each of the formulae (A1), (A2), (B1) and (B2), at least one n1 is an integer of 1 to 3;
X$^1$ represents each independently a single bond or a di- to deca-valent organic group;
X$^2$ represents each independently at each occurrence a single bond or a divalent organic group;
t is each independently at each occurrence an integer of 1 to 10;

α1 is each independently an integer of 1 to 9;
α1' is each independently an integer of 1 to 9;
$X^3$ represents each independently a single bond or a di- to deca-valent organic group;
β1 is each independently an integer of 1 to 9;
β1' is each independently an integer of 1 to 9;
$X^4$ represents each independently a single bond or a di- to deca-valent organic group;
γ1 is each independently an integer of 1 to 9;
γ1' is each independently an integer of 1 to 9;
$R^{a1}$ represents each independently at each occurrence $-Z^1-SiR^{11}_{p1}R^{12}_{q1}R^{13}_{r1}$;
$Z^1$ represents each independently at each occurrence an oxygen atom or a divalent organic group;
$R^{11}$ represents each independently at each occurrence $R^{a1'}$;
$R^{a1'}$ has the same definition as that of $R^{a1}$;
in $R^{a1}$, the number of Si to be linked linearly via a $Z^1$ group is up to 5;
$R^{12}$ represents each independently at each occurrence a hydroxyl group or a hydrolyzable group;
$R^{13}$ represents each independently at each occurrence a hydrogen atom or a $C_{1-2}$ alkyl group;
p1 is each independently at each occurrence an integer of 0 to 3;
q1 is each independently at each occurrence an integer of 0 to 3;
r1 is each independently at each occurrence an integer of 0 to 3;
where, in each of the formulae (C1) and (C2), at least one q1 is an integer of 1 to 3;
$R^{b1}$ represents each independently at each occurrence a hydroxyl group or a hydrolyzable group;
$R^{c1}$ represents each independently at each occurrence a hydrogen atom or a $C_{1-20}$ alkyl group;
k1 is each independently at each occurrence an integer of 1 to 3;
l1 is each independently at each occurrence an integer of 0 to 2;
m1 is each independently at each occurrence an integer of 0 to 2;
$X^5$ represents each independently a single bond or a di- to deca-valent organic group;
δ1 is each independently an integer of 1 to 9;
δ1' is each independently an integer of 1 to 9;
$R^{d1}$ represents each independently at each occurrence $-Z^2-CR^{51}_{p2}R^{52}_{q2}R^{53}_{r2}$;
$Z^2$ represents each independently at each occurrence an oxygen atom or a divalent organic group;
$R^{51}$ represents each independently at each occurrence $R^{d1'}$;
$R^{d1'}$ has the same definition as that of $R^{d1}$;
in $R^{d1}$, the number of C to be linked linearly via a $Z^2$ group is up to 5;
$R^{52}$ represents each independently at each occurrence $-Z^3-SiR^{55}_{n2}R^{56}_{3-n2}$;
$Z^3$ represents each independently at each occurrence a divalent organic group;
$R^{55}$ represents each independently at each occurrence a hydroxyl group or a hydrolyzable group;
$R^{56}$ represents each independently at each occurrence a hydrogen or a $C_{1-20}$ alkyl group;
n2 represents independently an integer of 0 to 3 per unit ($-Z^3-SiR^{55}_{n2}R^{56}_{3-n2}$);
where, in each of the formulae (D1) and (D2), at least one n2 is an integer of 1 to 3;
$R^{53}$ represents each independently at each occurrence a hydrogen or a $C_{1-20}$ alkyl group;
p2 is each independently at each occurrence an integer of 0 to 3;
q2 is each independently at each occurrence an integer of 0 to 3;
r2 is each independently at each occurrence an integer of 0 to 3;
$R^{c1}$ represents each independently at each occurrence $-Z^3-SiR^{55}_{n2}R^{56}_{3-n2}$;
$R^{f1}$ is H or a $C_{1-20}$ group;
k2 is each independently at each occurrence an integer of 0 to 3;
l2 is each independently at each occurrence an integer of 0 to 3; and
m2 is each independently at each occurrence an integer of 0 to 3;
where, in each of the formulae (D1) and (D2), at least one q2 is 2 or 3, or at least one l2 is 2 or 3, and
in the formula (I);
$Rf^1$ has the same definition as that of $Rf^2$;
PFPE has the same definition as defined above;
X is a di- to deca-valent organic group;
$R^g$ is a radical capturing group or a UV absorbing group;
ε1 is an integer of 1 to 9; and
ε1' is an integer of 1 to 9.

2. The surface-treating agent according to claim 1, wherein $Rf^1$ and $Rf^2$ are each independently at each occurrence a perfluoroalkyl group having 1 to 16 carbon atoms.

3. The surface-treating agent according to claim 1, wherein
PFPE is independently at each occurrence the following formula (a), (b) or (c):

$$-(OC_3F_6)_d- \quad (a)$$

wherein d is an integer of 1 to 200, $$-(OC_4F_8)_c-(OC_3F_6)_d-(OC_2F_4)_e-(OCF_2)_f- \quad (b)$$

wherein c and d are each independently an integer of 0 or more and 30 or less;
e and f are each independently an integer of 1 or more and 200 or less;
the sum of c, d, e and f is an integer of 10 or more and 200 or less; and
the occurrence order of the respective repeating units in parentheses with the subscript c, d, e or f is not limited in the formula, $$-(R^6-R^7)_j- \quad (c)$$

wherein $R^6$ is $OCF_2$ or $OC_2F_4$;
$R^7$ is a group selected from $OC_2F_4$, $OC_3F_6$, $OC_4F_8$, $OC_5F_{10}$ and $OC_6F_{12}$, or a combination of two or three groups selected from these groups; and
j is an integer of 2 to 100.

4. The surface-treating agent according to claim 1, wherein $R^g$ is at least one residue selected from the group consisting of residues of benzophenones, benzotriazoles, benzoic acid esters, phenyl salicylates, crotonic acids, malonic acid esters, organoacrylates, hindered amines, hindered phenols, triazines, hydroxybenzophenones, esters of a substituted and unsubstituted benzoic acid or salicylic acid compound, acrylate or alkoxycinnamates, oxamides, oxanilides, benzoxazinones, and benzoxazoles.

5. The surface-treating agent according to claim 1, wherein $R^g$ is a group represented by

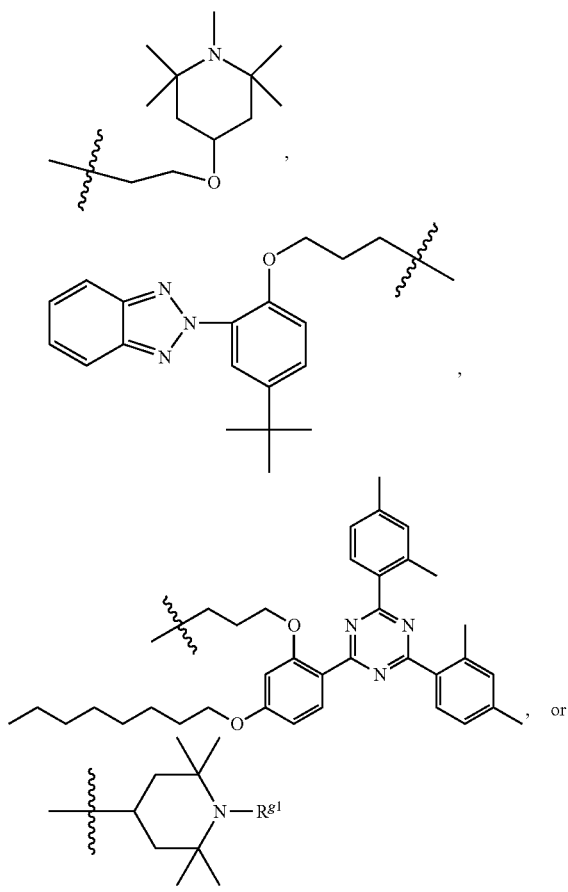

wherein R$^{g1}$ is a hydrogen atom, an alkyl group having 1 to 6 carbon atoms, or a phenyl group.

6. The surface-treating agent according to claim 1, wherein X is a divalent organic group.

7. The surface-treating agent according to claim 1, wherein X$^1$, X$^3$, X$^4$ and X$^5$ are each independently at each occurrence a divalent organic group.

8. The surface-treating agent according to claim 1, wherein the perfluoro(poly)ether group-containing silane compound and the perfluoro(poly)ether group-containing compound are contained at a mass ratio ranging from 100:0.001 to 100:110.

9. The surface-treating agent according to claim 1, wherein the number average molecular weights of an Rf$^1$-PFPE portion and an Rf$^2$-PFPE portion measured using $^{19}$F-NMR each independently range from 500 to 30,000.

10. The surface-treating agent according to claim 1, wherein the number average molecular weight of the perfluoro(poly)ether group-containing compound measured using $^{19}$F-NMR ranges from 2,000 to 8,000.

11. The surface-treating agent according to claim 1, further comprising one or more other components selected from a fluorine-containing oil, a silicone oil and a catalyst.

12. The surface-treating agent according to claim 1, further comprising a solvent.

13. The surface-treating agent according to claim 1, which is used as an antifouling coating agent or a water-proof coating agent.

14. The surface-treating agent according to claim 1, used for vacuum deposition.

15. A pellet comprising a surface-treating agent according to claim 1.

16. An article comprising a base material, and a layer formed of a surface-treating agent according to claim 1 on the surface of the base material.

17. The article according to claim 16, which is an optical member.

18. The article according to claim 16, which is a display.

19. The article according to claim 17, which is a display.

* * * * *